United States Patent
Suzuki

(10) Patent No.: US 9,475,949 B2
(45) Date of Patent: Oct. 25, 2016

(54) POLYMERIZABLE COMPOSITION, INK COMPOSITION FOR INKJET RECORDING, INKJET RECORDING METHOD AND RECORDED MATTER

(71) Applicant: FUJIFILM CORPORATION, Minato-ku, Tokyo (JP)

(72) Inventor: Shota Suzuki, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/810,484

(22) Filed: Jul. 28, 2015

(65) Prior Publication Data
US 2016/0068695 A1    Mar. 10, 2016

(30) Foreign Application Priority Data
Sep. 9, 2014 (JP) .................. 2014-183656

(51) Int. Cl.
| | |
|---|---|
| B41J 2/21 | (2006.01) |
| C09D 11/00 | (2014.01) |
| C09D 11/30 | (2014.01) |
| C08F 2/48 | (2006.01) |
| C09D 4/00 | (2006.01) |
| C09D 11/101 | (2014.01) |
| C09D 133/00 | (2006.01) |

(52) U.S. Cl.
CPC ............ *C09D 11/30* (2013.01); *C08F 2/48* (2013.01); *C09D 4/00* (2013.01); *C09D 11/00* (2013.01); *C09D 11/101* (2013.01); *C09D 133/00* (2013.01)

(58) Field of Classification Search
CPC ........ B41J 2/01; B41J 2/2107; B41J 11/002; C09D 11/00; C09D 11/30; C09D 11/101; C09D 4/00; C09D 133/00
See application file for complete search history.

(56) References Cited

U.S. PATENT DOCUMENTS

| | | | | |
|---|---|---|---|---|
| 6,368,769 B1* | 4/2002 | Ohkawa | ............... | C07C 381/12 |
| | | | | 264/401 |
| 7,635,181 B2* | 12/2009 | Tsuchimura | ............ | B41C 1/003 |
| | | | | 347/100 |
| 8,168,263 B2* | 5/2012 | Matsumura | .......... | C07D 277/74 |
| | | | | 427/466 |
| 8,192,803 B2* | 6/2012 | Makuta | .................. | B41J 11/002 |
| | | | | 427/372.2 |
| 8,991,994 B2* | 3/2015 | Sato | ..................... | B41J 2/17513 |
| | | | | 347/100 |

FOREIGN PATENT DOCUMENTS

JP    2013-23630 A    2/2013

OTHER PUBLICATIONS

Extended European Search Report dated Feb. 24, 2016, from the EPO in an European patent application corresponding to the instant patent application.

* cited by examiner

*Primary Examiner* — Anh T.N. Vo
(74) *Attorney, Agent, or Firm* — SOLARIS Intellectual Property Group, PLLC

(57) ABSTRACT

A polymerizable composition including: a compound represented by the following Formula (1); a polymerization initiator; and a polymerizable compound having a chemical structure different from the compound represented by the following Formula (1), an inkjet ink composition including the polymerizable composition, an inkjet ink recording method using the inkjet ink composition, and recorded matter.

Formula (1)

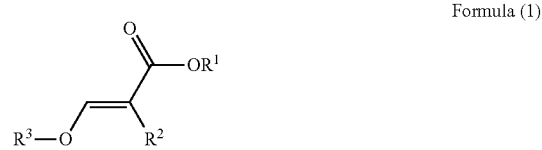

In Formula (1), each of $R^1$ and $R^2$ independently represents a hydrogen atom or a monovalent organic group and $R^3$ represents a monovalent organic group.

17 Claims, No Drawings

POLYMERIZABLE COMPOSITION, INK COMPOSITION FOR INKJET RECORDING, INKJET RECORDING METHOD AND RECORDED MATTER

CROSS-REFERENCE TO RELATED APPLICATION

The present application claims priority under 35 U.S.C. §119 to Japanese Patent Application No. 2014-183656, filed Sep. 9, 2014. The above application is hereby expressly incorporated by reference, in its entirety, into the present application.

BACKGROUND OF THE INVENTION

1. Technical Field

The present invention relates to a polymerizable composition, an ink composition for inkjet recording, an inkjet recording method, and a recorded matter.

2. Related Art

A polymerizable composition, which contains a polymerization initiator and a polymerizable compound and which is cured when active species that have been generated from the polymerization initiator by application of energy allow the polymerization of the polymerizable compound to proceed, is used for various applications; for example, a curable type ink composition, a coating agent, a painting material, and an image recording layer of a lithography plate.

There has been a demand for the polymerizable composition to cure with high sensitivity under application of energy and to form a cured film. However, a problem exists whereby, when high sensitivity is realized, an undesired curing reaction occurs due to heat or light, which results in reduced storage stability.

In terms of the use of the polymerizable composition, in particular, an ink composition for inkjet recording, which forms an image on a recording medium such as paper based on an image data signal, enables recording using an inexpensive apparatus. In addition, since an image is formed directly on a recording medium by discharging ink only onto a required image area, the ink can be used efficiently, and the running costs are low. Moreover, in the inkjet recording method, there is little noise. Accordingly, the inkjet recording method is excellent as an image recording method.

According to the inkjet recording method, it is possible to print not only on plain paper but also on a non-water absorbing recording medium such as a plastic sheet or a metal plate. Here, realizing a high printing speed and a high image quality in printing is an important issue, and the time needed for drying and curing the droplets after printing exerts significant influence on the productivity of printed matter and the sharpness of the printed image.

As one inkjet recording methods, there is a recording method using an ink for inkjet recording, the ink being curable by application of energy such as irradiation of radiation. According to this method, by performing irradiation of radiation, immediately after jetting an ink or when a specific period of time has elapsed since jetting the ink, thereby curing the ink droplets, the productivity of printing can be enhanced and a sharp image can be formed.

In an ultraviolet ray curable ink composition, excellent curability is required, and furthermore, for example, when an ink image is formed on a thermoplastic recording medium, the adhesion between the base material and the formed image, namely, the cured film, is required. Therefore, for the purpose of appropriately adjusting the crosslink density or the molecular weight, a chain-transfer agent, such as a thiol compound, is added to an ink composition. However, when the addition amount of the chain-transfer agent is increased, the storage stability of the ink composition tends to be lowered. In present circumstances, it is difficult to realize both the preservation of appropriate physical properties and storage stability.

As an example of a curable composition that is capable of being cured by irradiation with actinic energy rays, a curable resin composition, which includes an acrylic acid ester, a phenol-based antioxidant, and an organic phosphinic acid, and exhibits excellent curability, and in which discoloration of the cured film is suppressed, has been proposed (see, for example, Japanese Patent Application Laid-Open (JP-A) No. 2013-23630).

It is disclosed that in this curable composition, a mono-functional $\alpha,\beta$-unsaturated compound, for example, methylenemalonic acid, may be used as a polymerizable compound having a low molecular weight.

SUMMARY OF THE INVENTION

However, in the technique described in JP-A No. 2013-23630, consideration has been given to the storage stability of the curable composition, the preservation of curability, and the suppression of discoloration of the cured film formed; however, thorough investigations regarding, for example, the strength of the cured film that is formed using the curable composition, have not been conducted.

According to research conducted by the present inventors, it was found that the curable composition described in Patent Document 1 includes a component that does not contribute to the curing property, such as a phenol-based antioxidant, and therefore, there is still room for improvement of the strength of the obtained cured film and the adhesion between the cured film and the base material.

An aspect of the invention is to provide a polymerizable composition which can form a cured film having excellent adhesion to base materials and favorable strength.

Further, another aspect of the invention is to provide an ink composition for inkjet recording, the ink composition being capable of forming an image which has excellent adhesion to recording media and favorable strength, by application of energy; an inkjet recording method using the ink composition; and a recorded matter.

Specific means for addressing the above problems are as follows.

<1> A polymerizable composition including: a compound represented by the following Formula (1); a polymerization initiator; and a polymerizable compound having a chemical structure different from the compound represented by the following Formula (1):

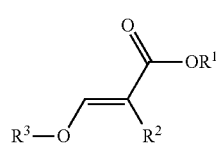

Formula (1)

wherein, in Formula (1), each of $R^1$ and $R^2$ independently represents a hydrogen atom or a monovalent organic group; and $R^3$ represents a monovalent organic group.

<2> The polymerizable composition according to the item <1>, wherein, in Formula (1), $R^1$ represents a hydrogen atom, an alkyl group or an aryl group; $R^3$ represents an alkyl group or an aryl group; and $R^2$ represents a hydrogen atom, a carboxylic acid group, a carboxylic acid ester group or a cyano group.

<3> The polymerizable composition according to the item <1> or the item <2>, wherein, in Formula (1), each of $R^1$ and $R^3$ independently represents an alkyl group having 1 to 8 carbon atoms; and $R^2$ represents a hydrogen atom, a carboxylic acid group or a carboxylic acid ester group.

<4> The polymerizable composition according to any one of the items <1> to <3>, wherein, in Formula (1), each of $R^1$ and $R^3$ independently represents a methyl group or an ethyl group; and $R^2$ represents a hydrogen atom.

<5> The polymerizable composition according to any one of the items <1> to <4>, wherein a content of the compound represented by Formula (1) is from 10% by mass to 30% by mass with respect to a total mass of the polymerizable composition.

<6> The polymerizable composition according to any one of the items <1> to <5>, wherein the polymerizable compound having a chemical structure different from the compound represented by Formula (1) includes a monofunctional polymerizable compound.

<7> The polymerizable composition according to the item <6>, wherein the monofunctional polymerizable compound is at least one selected from the group consisting of 2-phenoxyethyl acrylate, cyclic trimethylolpropane formal acrylate, isobornyl acrylate, tetrahydrofurfuryl acrylate, 2-(2-ethoxyethoxy)ethyl acrylate, 2-(2-vinyloxyethoxy)ethyl acrylate, octyl acrylate, decyl acrylate, tridecyl acrylate, isodecyl acrylate, lauryl acrylate, 3,3,5-trimethylcyclohexyl acrylate, 4-t-butylcyclohexyl acrylate and N-vinylcaprolactam.

<8> The polymerizable composition according to any one of the items <1> to <7>, wherein the polymerizable compound having a chemical structure different from the compound represented by Formula (1) includes a polyfunctional polymerizable compound.

<9> The polymerizable composition according to the item <8>, wherein the polyfunctional polymerizable compound is at least one selected from the group consisting of dipentaerythritol hexaacrylate, 3-methyl-1,5-pentanediol di(meth)acrylate, dipropylene glycol di(meth)acrylate and trimethylolpropane tri(meth)acrylate.

<10> The polymerizable composition according to any one of the items <1> to <9>, wherein the polymerization initiator includes at least one compound selected from the group consisting of acylphosphine oxide compounds and α-aminoketone compounds.

<11> An inkjet ink composition including the polymerizable composition according to any one of the items <1> to <10>.

<12> An inkjet ink recording method including: applying the inkjet ink composition according to the item <11> onto a recording medium using an inkjet recording apparatus; and curing the inkjet ink composition that has been applied onto the recording medium, by irradiating the ink composition with actinic radiation.

<13> Recorded matter that has been formed using the inkjet ink composition according to the item <11>, or that has been recorded by the inkjet ink recording method according to the item <12>.

The action of the invention is not clear, but is guessed as follows.

In the invention, the polymerizable composition includes a compound represented by Formula (1) as a polymerization component. The compound represented by Formula (1) itself also contributes to the curing reaction, as a polymerizable compound. Further, the compound represented by Formula (1) is a compound having a highly polar substituent represented by $R^3$—O— in a molecule thereof, and thus, by the inclusion of this compound, the polymerizable composition has high polarity and, as a result, in the polymerizable composition, the content of dissolved oxygen, which may become the cause of inhibition of polymerization, is reduced. Therefore, the active species generated when energy is applied to the polymerizable composition demonstrate their function in the state in which the inhibition of polymerization due to dissolved oxygen is suppressed, and polymerization and curing of the polymerizable compound included in the polymerizable composition proceed efficiently. Accordingly, it is thought that the polymerizable composition of the invention cures with high sensitivity, and that the cured film formed has a high crosslink density and a high strength, and also exhibits excellent adhesion with respect to the base material. Note that, a compound which has a similar skeleton but does not have a substituent represented by $R^3$—O— in a molecule thereof, such as alkylene malonic acid or an ester thereof, functions as a polymerizable compound; however, the effect of the invention cannot be exhibited, even if such a compound is incorporated in the polymerizable composition.

In a preferable embodiment of the invention, the polymerizable composition includes a monofunctional polymerizable compound as the polymerizable compound that has a structure different from the structure of the compound represented by Formula (1), whereby the viscosity of the polymerizable composition is maintained low, and the cured film obtained through polymerization has an appropriate molecular weight and crosslink density. Further, by using a polyfunctional polymerizable compound, as a polymerizable compound, in combination, the crosslink density of the cured film obtained may be further enhanced and a cured film having a higher strength can be formed. However, the invention is by no means limited to the estimation mechanism described above.

According to the invention, a polymerizable composition which can form a cured film having excellent adhesion to base materials and favorable strength may be provided.

Further, according to the invention, an ink composition for inkjet recording, the ink composition being capable of forming an image, which has excellent adhesion to recording media and favorable strength, by application of energy; an inkjet recording method using the ink composition; and a recorded matter may be provided.

DETAILED DESCRIPTION OF THE INVENTION

[Polymerizable Composition]

First, the polymerizable composition of the invention is explained.

In this specification, in the case of referring to one or both of "acrylate" and "methacrylate", the term "(meth)acrylate" may be used, and in the case of referring to one or both of "acryl" and "methacryl", the term "(meth)acryl" may be used.

In this specification, a numerical range expressed by using "to" represents a numerical range including numerical values described in front of and behind "to" as a maximum value and a minimum value, respectively.

In this specification, the term "process" includes not only an independent process, but also a case which cannot be clearly distinguished from other process, as long as the predetermined purpose of the process is achieved.

The polymerizable composition of the invention is a polymerizable composition including a compound represented by Formula (1) (hereinafter, may be referred to as "compound (A)"), a polymerization initiator (hereinafter, may be referred to as "initiator (B)), and a polymerizable compound (hereinafter, may be referred to as "additional polymerizable compound (C)") having a structure different from the structure of the compound represented by Formula (1) below.

<Compound Represented by Formula (1): Compound (A)>

The compound (A) in the invention is a compound represented by the following Formula (1), and by having a group represented by $R^3$—O— in a molecule thereof, the compound is a polymerizable compound having high polarity.

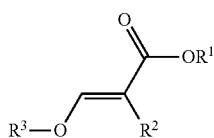

Formula (1)

In Formula (1), each of $R^1$ and $R^2$ independently represents a hydrogen atom or a monovalent organic group; and $R^3$ represents a monovalent organic group.

In the invention, the monovalent organic group indicates an organic substituent, and examples include an amino group, a carboxyl group, a carboxylic acid ester group, a sulfonic acid group, a sulfonic acid ester group, a silyl group, a nitro group, a cyano group, an alkyl group, an alkenyl group, an alkynyl group, an aryl group, a heterocyclic group, and a phosphono group.

The alkyl group may be straight chained, may have a branched chain, or may be cyclic. The alkyl group is preferably a straight chain alkyl group having from 1 to 8 carbon atoms or an alkyl group having a branched chain and having from 3 to 8 carbon atoms, more preferably a straight chain alkyl group having from 1 to 5 carbon atoms, and still more preferably a methyl group or an ethyl group.

The aryl group may have a monocyclic structure or a polycyclic structure, and as the aryl group, aryl groups having from 6 to 12 carbon atoms are described. The aryl group may have a substituent. Specific examples of the aryl group include a phenyl group, a benzyl group, a phenethyl group, a tolyl group, and a naphthyl group. A phenyl group, a benzyl group, and a phenethyl group are preferable.

As the ester in the carboxylic acid ester group and the sulfonic acid ester group, an alkyl ester and the like are described, and an alkyl ester group of an alkyl having from 1 to 4 carbon atoms is preferable.

As the alkenyl group and the alkynyl group, a group derived from the alkyl group described above and the like are preferable.

As the heterocyclic group, a substituent which contains, in the ring structure, an oxygen atom, a nitrogen atom, a sulfur atom, or the like as the heteroatom is described. Examples thereof include a thienyl group, a furyl group, a pyridyl group, an imidazolyl group, and a quinolyl group. A furyl group is preferable.

Examples of the monovalent organic group in $R^3$ include hydrocarbon groups such as an alkyl group or an aryl group. From the viewpoint that the polarity of the $R^3$—O— group is higher, a straight chain alkyl group having from 1 to 8 carbon atoms or an alkyl group having a branched chain and having from 3 to 8 carbon atoms is preferable, a straight chain alkyl group having from 1 to 5 carbon atoms is more preferable, and a methyl group or an ethyl group is still more preferable.

As the compound (A), a compound in which $R^1$ represents a hydrogen atom, an alkyl group, or an aryl group, $R^2$ represents a hydrogen atom, a carboxyl group, a carboxylic acid ester group, or a cyano group, and $R^3$ represents an alkyl group or an aryl group is preferable, a compound in which each of $R^1$ and $R^3$ independently represents an alkyl group having from 1 to 8 carbon atoms and $R^2$ represents a hydrogen atom, a carboxyl group, or a carboxylic acid ester group is more preferable, and a compound in which each of $R^1$ and $R^3$ independently represents a methyl group or an ethyl group and $R^2$ represents a hydrogen atom is still more preferable.

Preferable specific examples of the compound (A) include the following exemplified compounds (A-1) to (A-7); however, the invention is not limited to the following specific examples.

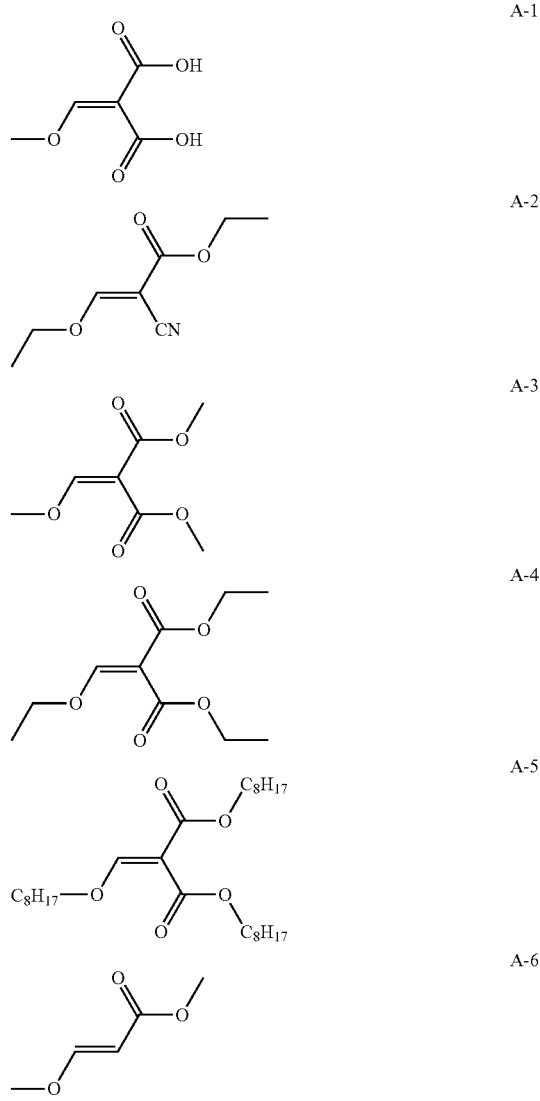

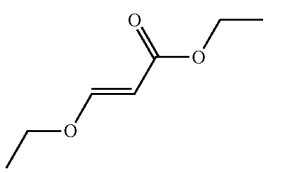
A-7

Among the exemplified compounds, the exemplified compounds (A-6), (A-7), and the like are preferable, from the viewpoint that the strength of the cured film obtained is higher.

The compound (A) according to the invention can be synthesized in accordance with the method described in, for example, International Publication (WO) 2009/056293. Further, the compound (A) is also available as a commercial product, and examples of the commercial product include methyl 3-methoxyacrylate manufactured by Tokyo Chemical Industry Co., Ltd. and BMMA (trade name) manufactured by Daicel Corporation.

One kind of compound (A) may be used singly, or two or more kinds thereof may be used in the polymerizable composition of the invention.

The content of the compound (A) in the polymerizable composition is not particularly limited; however, from the viewpoint of the effect, the content is preferably from 10% by mass to 30% by mass, and more preferably from 15% by mass to 25% by mass, with respect to the total amount of the polymerizable composition.

<Polymerization Initiator: Initiator (B)>

The polymerizable composition of the invention includes a polymerization initiator [initiator (B)]. The initiator (B) is a compound that generates polymerization initiation species, which serves as active species, by irradiation with actinic energy ray, and can be appropriately selected from known photopolymerization initiators and thermal polymerization initiators and used.

Here, the actinic energy ray is not particularly limited as long as the actinic energy ray can give energy that enables active species to be generated in the polymerizable composition when irradiated. Examples of the actinic energy ray include α rays, γ rays, X rays, ultraviolet rays, infrared rays, visible light, and electron beams. Among them, from the viewpoints of curing sensitivity and the availability of the equipment, ultraviolet rays and electron beams are preferable, and ultraviolet rays are more preferable as the actinic energy ray.

Accordingly, it is preferable that the polymerizable composition of the invention is a polymerizable composition that is curable when irradiated with ultraviolet ray as the actinic energy ray.

A radical polymerization initiator is preferably used as the initiator (B) in the invention, and preferable examples include (a) an aromatic ketone compound, (b) an acylphosphine compound, (c) an aromatic onium salt compound, (d) an organic peroxide, (e) a thio compound, (f) a hexaarylbiimidazole compound, (g) a ketoxime ester compound, (h) a borate compound, (i) an azinium compound, (j) a mettalocene compound, (k) an active ester compound, (l) a compound having a carbon-halogen bond, (m) an α-aminoketone compound, and (n) an alkylamine compound.

Examples of the radical polymerization initiator may include radical polymerization initiators described in paragraphs [0135] to [0208] of JP-A No. 2006-085049.

From the viewpoint of having excellent curing sensitivity, preferable examples of the initiator (B), which may be used in the invention, include initiators (B) selected from the group consisting of (l) a compound having a carbon-halogen bond, (g) a ketoxime ester compound, (m) an α-aminoketone compound, and an acylphosphine oxide compound, which is (b) an acylphosphine compound. Above all, an initiator (B) selected from the group consisting of an α-aminoketone compound and an acylphosphine oxide compound is preferable.

Examples of the compound having a carbon-halogen bond include triazine compounds, and examples thereof may include compounds described in JP-A No. H8-269049, Japanese Patent Application National Publication (JP-A) No. 2005-503545, Non-Patent Document J. Am. Chem. Soc. 1999, 121, pages 6167 to 6175, and the like.

Examples of the ketoxime ester compound may include compounds described in JP-A No. 2006-516246, JP-A No. 2001-233842, JP-A No. 2004-534797, JP-A No. 2005-097141, JP-A No. 2006-342166, and the like.

Examples of the α-aminoketone compound include 2-methyl-1-phenyl-2-morpholinopropan-1-one, 2-methyl-1-[4-(hexyl)phenyl]-2-morpholinopropan-1-one, and 2-ethyl-2-dimethylamino-1-(4-morpholinophenyl)-butanone-1.

The α-aminoketone compound is also available as a commercial product, and examples thereof include IRGACURE (registered trademark) series manufactured by BASF, for example, IRGACURE 907, IRGACURE 369, and IRGACURE 379 (all trade names), and the like. These commercially available products can be preferably used in the invention.

Examples of the acylphosphine oxide compound may include compounds described in Japanese Patent Application Publication (JP-B) No. S63-40799, JP-B No. H5-29234, JP-A No. H10-95788, JP-A No. H10-29997, and the like.

Examples of the acylphosphine oxide compound available as a commercial product include IRGACURE (registered trademark) series and DAROCUR (registered trademark) series, all manufactured by BASF, for example, IRGACURE 819, IRGACURE 1800, IRGACURE 1870, and DAROCUR TPO (all trade names), and the like. These commercially available products can be preferably used in the invention.

In the case of using the polymerizable composition of the invention in the ink composition described below, particularly, in a white ink composition or a transparent ink composition which is colorless, it is preferable to use a photopolymerization initiator having excellent resistance to discoloration. From such a point of view, a preferable example of a commercially available polymerization initiator, which is a compound involved in the α-aminoketone compounds is IRGACURE (registered trademark) 907, and preferable examples of a commercially available polymerization initiator, which is a compound involved in the acylphosphine oxide compounds include IRGACURE (registered trademark) 819 and DAROCUR (registered trademark) TPO.

The α-aminoketone compound and the acylphosphine oxide compound, as the initiators (B), are described in detail, for example, in paragraphs [0044] to [0077] of JP-A No. 2010-235697. The polymerization initiators described in the above document can be preferably used also in the invention.

One kind of initiator (B) may be used singly, or two or more kinds thereof may be used in the polymerizable composition of the invention.

The content of the initiator (B) in the polymerizable composition is preferably in a range of from 0.1% by mass to 30% by mass, more preferably in a range of from 1.0% by mass to 20% by mass, and still more preferably in a range of from 2.0% by mass to 15% by mass, in terms of solid content.

The content of the initiator (B) in the polymerizable composition of the invention is preferably in a range of from 0.01 parts by mass to 35 parts by mass, more preferably in a range of from 0.1 parts by mass to 30 parts by mass, and still more preferably in a range of from 0.5 parts by mass to 20 parts by mass, with respect to 100 parts by mass of the total amount of the polymerizable compounds included in the polymerizable composition of the invention. Here, "the total amount of the polymerizable compounds" indicates the total amount of the compound (A) and additional polymerizable compound (C) included in the polymerizable composition.

<Polymerizable Compound Having Structure Different from that of Compound Represented by Formula (1): Additional Polymerizable Compound (C)>

The polymerizable composition of the invention includes, in addition to the compound represented by Formula (1) described above, an additional polymerizable compound [additional polymerizable compound (C)] having a structure different from the structure of the compound represented by Formula (1).

The additional polymerizable compound (C), which can be used in the invention, may be any compound as long as the compound has one or more radically polymerizable ethylenically unsaturated bonds in a molecule thereof. The additional polymerizable compound (C) may have a form of a monomer, an oligomer, or a mixture thereof, but preferably has a form of a monomer.

Examples of the additional polymerizable compound (C) having a radically polymerizable ethylenically unsaturated bond include unsaturated carboxylic acids such as acrylic acid, methacrylic acid, itaconic acid, crotonic acid, isocrotonic acid, or maleic acid, salts thereof, ester compounds thereof, and amides thereof; and radically polymerizable monomers such as anhydrides having an ethylenically unsaturated group, acrylonitrile, styrene, or various unsaturated polyesters, unsaturated polyethers, unsaturated polyamides, or unsaturated urethanes.

More specifically, examples include an ester of an unsaturated carboxylic acid with a polyhydric alcohol compound; an amide of an unsaturated carboxylic acid with a polyvalent amine compound; an addition reaction product of an unsaturated carboxylic acid ester or amide having a nucleophilic substituent, such as a hydroxyl group, an amino group, or a mercapto group, with a monofunctional or polyfunctional isocyanate compound or epoxy compound; and a dehydration condensation reaction product of an unsaturated carboxylic acid ester or amide having a nucleophilic substituent with a monofunctional or polyfunctional carboxylic acid.

Further, specific examples include an addition reaction product of an unsaturated carboxylic acid ester or amide having an electrophilic substituent, such as an isocyanato group or an epoxy group, with a monofunctional or polyfunctional alcohol, amine, or thiol; and a substitution reaction product of an unsaturated carboxylic acid ester or amide having a releasable substituent, such as a halogen group or a tosyloxy group, with a monofunctional or polyfunctional alcohol, amine, or thiol.

Moreover, as examples of the additional polymerizable compound (C), a compound group in which the above unsaturated carboxylic acid is replaced with an unsaturated phosphonic acid, styrene, vinyl ether, or the like can be used.

The additional polymerizable compounds (C) are described in JP-A No. 2006-508380, JP-A No. 2002-287344, JP-A No. 2008-256850, JP-A No. 2001-342222, JP-A No. H9-179296, JP-A No. H9-179297, JP-A No. H9-179298, JP-A No. 2004-294935, JP-A No. 2006-243493, JP-A No. 2002-275129, JP-A No. 2003-64130, JP-A No. 2003-280187, JP-A No. H10-333321, and the like. The polymerizable compounds described in these documents can also be used as the additional polymerizable compound (C) in the invention.

A monofunctional polymerizable compound may be added as the additional polymerizable compound (C) in the invention. As the monofunctional polymerizable compound, a compound having only one radically polymerizable ethylenically unsaturated bond in the molecule is preferable.

By the inclusion of a monofunctional polymerizable compound as the additional polymerizable compound (C), the viscosity of the polymerizable composition can be reduced, since the monofunctional polymerizable compound can also exhibit a function as a solvent of the polymerizable composition. In a case in which the polymerizable composition of the invention does not contain a solvent, or also in a case in which the content of solvent is made 5% by mass or less as described below, the viscosity of the polymerizable composition can be reduced. When the polymerizable composition does not contain a solvent or when the content of solvent is reduced, the problem of odor due to volatilization of the solvent is suppressed. By further reducing the content of the component, which does not contribute to curing, in the polymerizable composition, the curability can be preserved at a high level.

Specific examples of the monofunctional polymerizable compound, which can be used in the invention, include acrylic acid derivatives such as 2-ethylhexyl acrylate, 2-hydroxyethyl acrylate, butoxyethyl acrylate, carbitol acrylate, cyclohexyl acrylate, tetrahydrofurfuryl acrylate, benzyl acrylate, oligoester acrylate, 2-phenoxyethyl acrylate, cyclic trimethylolpropane formal acrylate, isobornyl acrylate, 2-(2-ethoxyethoxy)ethyl acrylate, 2-(2-vinyloxyethoxy)ethyl acrylate, octyl acrylate, decyl acrylate, tridecyl acrylate, isodecyl acrylate, lauryl acrylate, 3,3,5-trimethylcyclohexyl acrylate, 4-t-butylcyclohexyl acrylate, N-methylolacrylamide, diacetone acrylamide, epoxy acrylate, or N-hydroxyethyl acrylamide; methacrylic acid derivatives such as methyl methacrylate, n-butyl methacrylate, 2-ethylhexyl methacrylate, lauryl methacrylate, allyl methacrylate, glycidyl methacrylate, benzyl methacrylate, or dimethylaminomethyl methacrylate; derivatives of allyl compounds such as allyl glycidyl ether; N-vinylcaprolactam; and the like.

From the viewpoint of exhibiting excellent curability, the monofunctional polymerizable compound is preferably at least one selected from the group consisting of 2-phenoxyethyl acrylate, cyclic trimethylolpropane formal acrylate, isobornyl acrylate, tetrahydrofurfuryl acrylate, 2-(2-ethoxyethoxy)ethyl acrylate, 2-(2-vinyloxyethoxy)ethyl acrylate, octyl acrylate, decyl acrylate, tridecyl acrylate, isodecyl acrylate, lauryl acrylate, 3,3,5-trimethylcyclohexyl acrylate, 4-t-butylcyclohexyl acrylate, and N-vinylcaprolactam.

From the viewpoint of further enhancing the strength of the film to be formed, a polyfunctional polymerizable compound can be incorporated in the polymerizable composition of the invention.

Examples of the polyfunctional polymerizable compound, which can be used in the invention, include acrylic acid derivatives such as bis(4-acryloyloxy polyethoxy phenyl)propane, neopentyl glycol diacrylate, 1,6-hexanediol diacrylate, ethylene glycol diacrylate, diethylene glycol diacrylate, triethylene glycol diacrylate, tetraethylene glycol diacrylate, polyethylene glycol diacrylate, polypropylene glycol diacrylate, pentaerythritol triacrylate, pentaerythritol tetraacrylate, or dipentaerythritol tetraacrylate; methacrylic acid derivatives such as tetramethylolmethane tetramethacrylate, 1,6-hexanediol dimethacrylate, ethylene glycol dimethacrylate, triethylene glycol dimethacrylate, polyethylene glycol dimethacrylate, polypropylene glycol dimethacrylate, trimethylolethane trimethacrylate, trimethylolpropane trimethacrylate, or 2,2-bis(4-methacryloyloxy polyethoxy phenyl)propane; derivatives of allyl compounds such as diallyl phthalate or triallyl trimellitate; and di- or trivinylether compounds such as ethylene glycol divinyl ether, diethylene glycol divinyl ether, triethylene glycol divinyl ether, propylene glycol divinyl ether, dipropylene glycol divinyl ether, butanediol divinyl ether, hexanediol divinyl ether, cyclohexanedimethanol divinyl ether, or trimethylolpropane trivinyl ether.

Above all, a polyfunctional acrylate compound having two or more radically polymerizable ethylenically unsaturated bonds in a molecule thereof is preferable as the polyfunctional polymerizable compound.

The polyfunctional acrylate compound is preferably a compound having from 2 to 8 radically polymerizable ethylenically unsaturated bonds in a molecule thereof, and more preferably a compound including from 2 to 6 radically polymerizable ethylenically unsaturated bonds.

More specifically, examples of the polyfunctional polymerizable compound in the invention include polyfunctional (meth)acrylate compounds such as bis(4-(meth)acryloyloxy polyethoxy phenyl)propane, tripropylene glycol di(meth)acrylate, polyethylene glycol di(meth)acrylate, polypropylene glycol di(meth)acrylate, 3-methyl-1,5-pentanediol di(meth)acrylate, dipropylene glycol di(meth)acrylate, trimethylolpropane tri(meth)acrylate, dipentaerythritol tetra(meth)acrylate, trimethylolpropane (PO modified) tri(meth)acrylate, oligo ester (meth)acrylate, hydroxypivalic acid neopentyl glycol di(meth)acrylate, tetramethylolmethane tri(meth)acrylate, dimethylol tricyclodecane di(meth)acrylate, modified glycerin tri(meth)acrylate, dipentaerythritol hexaacrylate, (meth)acrylic acid adduct of bisphenol A diglycidyl ether, modified bisphenol A di(meth)acrylate, PO added bisphenol A di(meth)acrylate, EO added bisphenol A di(meth)acrylate, dipentaerythritol hexa(meth)acrylate, (meth)acrylic acid adduct of propylene glycol diglycidyl ether, or ditrimethylolpropane tetra(meth)acrylate. In addition, examples further include allyl compounds such as diallyl phthalate or triallyl trimellitate. Here, PO represents propylene oxide and EO represents ethylene oxide.

Further, a polyfunctional vinyl ether is also preferably described as a polyfunctional radically polymerizable monomer. Examples of the polyfunctional vinyl ether include divinyl ethers such as ethylene glycol divinyl ether, diethylene glycol divinyl ether, triethylene glycol divinyl ether, polyethylene glycol divinyl ether, propylene glycol divinyl ether, dipropylene glycol divinyl ether, butylene glycol divinyl ether, butanediol divinyl ether, hexanediol divinyl ether, cyclohexanedimethanol divinyl ether, bisphenol A alkylene oxide divinyl ether, or bisphenol F alkylene oxide divinyl ether; and polyfunctional vinyl ethers such as trimethylolethane trivinyl ether, trimethylolpropane trivinyl ether, ditrimethylolpropane tetravinyl ether, glycerin trivinyl ether, pentaerythritol tetravinyl ether, dipentaerythritol pentavinyl ether, dipentaerythritol hexavinyl ether, ethylene oxide-added trimethylolpropane trivinyl ether, propylene oxide-added trimethylolpropane trivinyl ether, ethylene oxide-added ditrimethylolpropane tetravinyl ether, propylene oxide-added ditrimethylolpropane tetravinyl ether, ethylene oxide-added pentaerythritol tetravinyl ether, propylene oxide-added pentaerythritol tetravinyl ether, ethylene oxide-added dipentaerythritol hexavinyl ether, or propylene oxide-added dipentaerythritol hexavinyl ether. Among these polyfunctional vinyl ether compounds, divinyl ether compounds are particularly preferable.

Moreover, other than the above compounds, photo-curable type polymerizable compounds which are used in photo-polymerizable compositions and are described in, for example, JP-A No. H7-159983, JP-B No. H7-31399, JP-A No. H8-224982, JP-A No. H10-863, JP-A No. H9-134011, and JP-A No. 2004-514014 are known as polyfunctional radically polymerizable compounds, and these compounds can also be used in the polymerizable composition according to the invention.

Above all, dipentaerythritol hexaacrylate, 3-methyl-1,5-pentanediol di(meth)acrylate, dipropylene glycol di(meth)acrylate, trimethylolpropane tri(meth)acrylate, and the like, which are polyfunctional (meth)acrylate compounds, are preferable from the viewpoint of exhibiting excellent curability.

The content of the additional polymerizable compound (C) in the polymerizable composition of the invention is preferably from 45% by mass to 90% by mass, more preferably from 50% by mass to 90% by mass, and still more preferably from 55% by mass to 80% by mass, with respect to the total solids content of the polymerizable composition.

The total amount of the compound (A) and the additional polymerizable compound (C) is preferably from 55% by mass to 97% by mass, more preferably from 60% by mass to 95% by mass, and particularly preferably from 65% by mass to 90% by mass, with respect to the total solids content of the polymerizable composition.

When the polymerizable composition of the invention includes a monofunctional polymerizable compound, in the case of using the polymerizable composition in an ink composition for inkjet recording, the viscosity of the ink composition is easily adjusted to a viscosity appropriate for inkjet recording, and the image formed exhibits excellent curability and excellent adhesion to the recording medium that serves as the base material.

In the case of adding a polyfunctional polymerizable compound as the additional polymerizable compound (C), the content of the polyfunctional polymerizable compound is preferably 40% by mass or lower, more preferably 30% by mass or lower, and still more preferably 20% by mass or lower, with respect to the total amount of the polymerizable compounds including the compound (A) and the additional polymerizable compound (C). The lower limit is not particularly limited, and all of the additional polymerizable compounds (C) may be monofunctional polymerizable compounds. Note that, in order to obtain the effect of further enhancing the strength of the cured film formed by the inclusion of a polyfunctional polymerizable compound, the content of the polyfunctional polymerizable compound is preferably 3% by mass or higher with respect to the total amount of the additional polymerizable compounds (C).

—Other Component—

In the polymerizable composition of the invention, other components may be used in combination with the compound (A), the initiator (B), and the additional polymerizable compound (C), for the purpose of enhancing the physical properties and the like, as long as the effects of the invention are not impaired.

Hereinafter, some of these components are explained.

<Sensitizer>

A sensitizer may be added to the polymerizable composition of the invention, if necessary. The sensitizer may be any compound as long as the compound undergoes sensitization with respect to the initiator (B) according to an electron transfer mechanism or an energy transfer mechanism, and a known sensitizer can be used as appropriate.

Preferable examples of the sensitizer may include the following compounds, which have an absorption wavelength in the region of from 350 nm to 450 nm.

Polynuclear aromatic compounds such as anthracene, pyrene, perylene, or triphenylene; thioxanthone compounds such as isopropyl thioxanthone; xanthene compounds such as fluorescein, eosin, erythrosine, Rhodamine B, or rose bengal; cyanine compounds such as thiacarbocyanine or oxacarbocyanine; merocyanine compounds such as merocyanine or carbomerocyanine; thiazine compounds such as thionine, methylene blue, or toluidine blue; acridine compounds such as acridine orange, chloroflavin, or acriflavin; anthraquinone compounds; squarylium compounds; and coumarin compounds such as 7-diethylamino-4-methylcoumarin; and the like are described. From the viewpoint of having excellent curability, polynuclear aromatic compounds and thioxanthone compounds are preferable.

Further, a sensitizing dye described in JP-A No. 2008-95086 can also be used in the invention.

<Cosensitizer>

The polymerizable composition according to the invention may also contain a cosensitizer. In the invention, the cosensitizer has a function of further improving the sensitivity of the sensitizer with respect to actinic energy ray, a function of preventing oxygen from inhibiting polymerization of the polymerizable compound, or the like.

Examples of the cosensitizer include amine compounds, for example, compounds described in M. R. Sander et al., "Journal of Polymer Science", vol. 10, page 3173 (1972), JP-B No. S44-20189, JP-A No. S51-82102, JP-A No. S52-134692, JP-A No. S59-138205, JP-A No. S60-84305, JP-A No. S62-18537, JP-A No. S64-33104, and Research Disclosure No. 33825. Specific examples thereof include triethanolamine, ethyl p-dimethylaminobenzoate, p-formyldimethylaniline, and p-methylthiodimethylaniline.

Other examples of the cosensitizer include thiol compounds and sulfide compounds, for example, thiol compounds described in JP-A No. S53-702, JP-B No. S55-500806, and JP-A No. H5-142772, and disulfide compounds described in JP-A No. S56-75643. Specific examples include 2-mercaptobenzothiazole, 2-mercaptobenzoxazole, 2-mercaptobenzimidazole, 2-mercapto-4(3H)-quinazoline, and β-mercaptonaphthalene.

Yet other examples of the cosensitizer include amino acid compounds (for example, N-phenylglycine or the like), organometallic compounds (for example, tributyltin acetate or the like) described in JP-B No. S48-42965, hydrogen donors described in JP-B No. S55-34414, sulfur compounds (for example, trithiane or the like) described in JP-A No. H6-308727, phosphorus compounds (for example, diethylphosphite or the like) described in JP-A No. H6-250387, and Si—H compounds and Ge—H compounds described in JP-A No. H8-54735.

<Antioxidant>

In order to improve the stability of the polymerizable composition, an antioxidant may be added to the extent of not impairing the effects of the invention.

Examples of the antioxidant may include compounds described in European Patent Publication Nos. 223739, 309401, 309402, 310551, 310552, and 459416, German Patent Publication No. 3435443, JP-A Nos. S54-48535, S62-262047, S63-113536, and S63-163351, JP-A No. H2-262654, JP-A No. H2-71262, JP-A No. H3-121449, JP-A No. H5-61166, JP-A No. H5-119449, U.S. Pat. No. 4,814,262, U.S. Pat. No. 4,980,275, and the like.

The addition amount thereof is selected as appropriate according to the intended use; however, the addition amount is generally from about 0.1% by mass to about 8% by mass in terms of solid content.

<Polymerization Inhibitor>

The polymerizable composition of the invention preferably includes a polymerization initiator. Incorporation of a polymerization inhibitor may result in further improvement in storage stability with respect to thermal polymerization of the polymerizable composition.

For example, in the case of using the polymerizable composition of the invention in an ink composition for inkjet recording, it is said that the ink composition is preferably heated at a temperature in a range of from 40° C. to 80° C. to lower the viscosity thereof and then ejected, by using an inkjet recording apparatus. In general, the ink composition is often ejected at a temperature within the above range, but in order to prevent clogging of head due to undesired thermal polymerization in the case of heating, it is preferable to add a polymerization inhibitor.

Examples of the polymerization initiator include hydroquinone, benzoquinone, p-methoxyphenol, tetramethylpiperidin-1-oxyl (TEMPO), 1-oxyl-2,2,6,6-tetramethyl-4-hydroxypiperidine (TEMPOL), and aluminum-cupferron complex (cupferron Al). As the polymerization inhibitor, a commercially available product can also be used and, for example, GENORAD 16 (trade name, manufactured by Rahn) or the like can be used.

In a case in which the polymerizable composition of the invention contains a polymerization inhibitor, the content of the polymerization inhibitor is preferably in a range of from 200 ppm to 20,000 ppm with respect to the total amount of the polymerizable composition.

<Solvent>

In order to further enhance the adhesion between the cured film and the base material, a trace amount of organic solvent can also be added to the polymerizable composition of the invention.

Examples of the solvent include ketones such as acetone, methyl ethyl ketone, or diethyl ketone; alcohols such as methanol, ethanol, 2-propanol, 1-propanol, 1-butanol, or tert-butanol; chlorine-containing solvents such as chloroform or methylene chloride; aromatic solvents such as benzene or toluene; ester solvents such as ethyl acetate, butyl acetate, or isopropyl acetate; ether solvents such as diethyl ether, tetrahydrofuran, or dioxane; and glycol ether solvents such as ethylene glycol monomethyl ether or ethylene glycol dimethyl ether.

In the case of using a solvent, it is effective to add a solvent within a range of amount that does not cause problems in solvent resistance of the recording medium, odor at the time of ejection or curing, and the like. The content of the solvent is preferably 5% by mass or lower, more preferably in a range of from 0.01% by mass to 5% by mass, and still more preferably in a range of from 0.01% by mass to 3% by mass, with respect to the total amount of the polymerizable composition.

<Water>

Further, the polymerizable composition of the invention may include a trace amount of water as long as the effects of the invention are not impaired, but it is preferable that the polymerizable composition of the invention is a non-aqueous polymerizable composition that does not substantially contain water. Specifically, the content of water is preferably 3% by mass or lower, more preferably 2% by mass or lower, and most preferably 1% by mass or lower, with respect to the total amount of the polymerizable composition.

<High Molecular Weight Compound>

In order to adjust film physical properties, various kinds of high molecular weight compounds can be added to the polymerizable composition of the invention. Examples of the high molecular weight compounds, which can be used, include an acrylic resin, a polyurethane resin, a polyamide resin, a polyester resin, an epoxy resin, a phenol resin, a polycarbonate resin, a polyvinyl butyral resin, a polyvinyl formal resin, shellac, a vinyl resin, rubber, wax, and other natural resins. Two or more kinds of the high molecular weight compounds may be used in combination.

Above all, from the viewpoint of exhibiting excellent adhesion to the base material, a vinyl polymer obtained by polymerization using an acrylic monomer is preferable. The vinyl polymer may be a homopolymer formed from an acrylic monomer, or may be a copolymer formed from an acrylic monomer and other monomer. In a case in which the high molecular weight compound is a copolymer including an acrylic monomer, a copolymer that contains, as the copolymerization composition of the high molecular weight compound, a structural unit derived from an "acrylic monomer" and a structural unit derived from a "carboxyl group-containing monomer", an "alkyl methacrylate ester", or an "alkyl acrylate ester" is also used preferably.

<Surfactant>

A surfactant may be added to the polymerizable composition of the invention. Examples of the surfactant include surfactants described in JP-A Nos. S62-173463 and S62-183457. Examples thereof include anionic surfactants such as dialkylsulfosuccinic acid salts, alkylnaphthalenesulfonic acid salts, or fatty acid salts; nonionic surfactants such as polyoxyethylene alkyl ether, polyoxyethylene alkylallyl ether, acetylene glycol, or polyoxyethylene/polyoxypropylene block copolymers; and cationic surfactants such as alkylamine salts or quaternary ammonium salts. An organofluoro compound that does not have a polymerizable group may be used instead of using the surfactant. It is preferable that the organofluoro compound is hydrophobic. Examples of the organofluoro compound include fluorocarbon surfactants, oily fluorine-containing compounds (for example, fluorine oil), solid fluorine compound resins (for example, a tetrafluoroethylene resin), and compounds described in JP-B No. S57-9053 (column Nos. 8 to 17) and JP-A No. S62-135826.

<Other Additives>

In addition to the above, the polymerizable composition of the invention may contain, if necessary, known additives such as a leveling additive, a matting agent, a wax for adjustment of film physical properties, or a tackifier that does not inhibit polymerization in view of improvement in adhesion to a recording medium made of, for example, polyolefin, PET, or the like.

Specifically, the tackifier is a high molecular weight adhesive polymer described on pages 5 to 6 in JP-A No. 2001-49200 (for example, a copolymer formed from an ester of (meth)acrylic acid and an alcohol having an alkyl group having from 1 to 20 carbon atoms, an ester of (meth)acrylic acid and an alicyclic alcohol having from 3 to 14 carbon atoms, and an ester of (meth)acrylic acid and an aromatic alcohol having from 6 to 14 carbon atoms), a low molecular weight adhesiveness-imparting resin having a polymerizable unsaturated bond, or the like.

Since the polymerizable composition of the invention cures with high sensitivity by application of energy, and the cured film formed has a high strength and favorable adhesion to base materials, the polymerizable composition of the invention is preferably used for various applications, for example, a coating agent, an adhesive, a painting material, an ink composition, or the like. Above all, the polymerizable composition of the invention is preferably used in an ink composition for inkjet recording described below.

[Base Material]

There is no particular limitation on the base material capable of being applied with the polymerizable composition of the invention, and the polymerizable composition of the invention can be applied onto various base materials according to the mode of use of the polymerizable composition.

As the base material, to which the polymerizable composition of the invention can be applied, any of an organic base material, for example, paper, wood, a non-absorbing resin material, a resin film obtained by molding a resin material into a film shape, or the like; or an inorganic base material made of ceramic, a metal, glass, or the like can be used.

Examples of the resin film include a polyethylene terephthalate (PET) film, a biaxially stretched polystyrene (OPS) film, a biaxially stretched polypropylene (OPP) film, a biaxially stretched polyamide (ONy) film, a polyvinyl chloride (PVC) film, a polyethylene (PE) film, a triacetylcellulose (TAC) film, a polycarbonate (PC) film, and an acrylic resin film.

The base material may be a base material having a multilayer structure, such as a base material having a resin layer on paper or a metal sheet, or a base material provided with a metal layer on the surface of a resin film.

Hereinafter, a base material which is used when the polmerizable composition of the invention is applied to an ink composition, namely, a recording medium is described in detail.

As the light source which emits ultraviolet ray and is suitably used for energy application, a light source that emits light having a wavelength within the range of from 300 nm to 400 nm is preferably used, and a known ultraviolet ray lamp, for example, a low pressure mercury lamp, a high pressure mercury lamp, a short arc discharge lamp, an ultraviolet ray emitting diode, a semiconductor laser, a fluorescent lamp, or the like can be used. Depending on the amount of light or wavelength suitable for the initiator, a high pressure mercury lamp or a metal halide lamp, each of which belongs to high pressure discharge lamps, or a xenon lamp which belongs to short arc discharge lamps is preferably used. Further, from the viewpoint of saving energy, an ultraviolet ray emitting diode is also preferably used.

[Ink Composition for Inkjet Recording]

The ink composition for inkjet recording (hereinafter, may be referred to as, simply, "ink composition") according to the invention is an ink composition for inkjet recording, the ink composition containing the above-described polymerizable composition of the invention.

Since the ink composition of the invention contains the compound (A), the initiator (B), and the additional polymerizable compound (C), by application of energy, an ink image having favorable adhesion to the base material and having a high strength can be formed.

The ink composition of the invention is not particularly limited as long as the ink composition contains the above-described polymerizable composition of the invention.

The ink composition of the invention may include, other than the above components, various compounds that are generally used in ink compositions, depending on the purposes, as long as the effects of the invention are not impaired.

<Colorant>

When the ink composition of the invention contains a colorant, the ink composition can form a visible image. The colorant, which may be used herein, is not particularly limited, and may be selected as appropriate from various kinds of known coloring materials (pigments or dyes) and used, according to the intended use. For example, in the case of forming an image having excellent resistance to climatic conditions, a pigment is preferably used. As a dye, any of a water-soluble dye or an oil-soluble dye may be used, but an oil-soluble dye is preferably used.

It is needless to say that the ink composition of the invention can be used also as a transparent ink composition that does not contain a colorant.

<Pigment>

A pigment preferably used in the ink composition in the invention is described.

The pigment is not particularly limited, and any commercially available organic and inorganic pigment, a pigment dispersed in an insoluble resin or the like as a dispersion medium, or a pigment having a resin grafted on the surface thereof can be used. Resin particles dyed with a dye can also be used.

Examples of these pigments include the pigments described in Seijiro Ito "Pigment dictionary" (2000), W. Herbst, K. Hunger "Industrial Organic Pigments", JP-A No. 2002-12607, JP-A No. 2002-188025, JP-A No. 2003-26978, and JP-A No. 2003-342503.

Specific examples of the organic and inorganic pigments exhibiting, for example, yellow color employable in the present invention, include a monoazo pigment such as C.I. Pigment Yellow 1 (e.g., Fast Yellow G), and C.I. Pigment Yellow 74, a disazo pigment such as C.I. Pigment Yellow 12 (e.g., Disazo Yellow AAA) and C.I. Pigment Yellow 17, a non-benzidine azo pigment such as C.I. Pigment Yellow 180, an azo lake pigment such as C.I. Pigment Yellow 100 (e.g., Tartrazine Yellow Lake), a condensed azo pigment such as C.I. Pigment Yellow 95 (e.g., Condensed Azo Yellow GR), an acidic dye lake pigment such as C.I. Pigment Yellow 115 (e.g., Quinoline Yellow Lake), a basic dye lake pigment such as C.I. Pigment Yellow 18 (e.g., Thioflavin Lake), an anthraquinone pigment such as Flavanthrone Yellow (Y-24), an isoindolinone pigment such as Isoindolinone Yellow 3RLT (Y-110), a quinophthalone pigment such as Quinophthalone Yellow (Y-138), an isoindoline pigment such as Isoindoline Yellow (Y-139), a nitroso pigment such as C.I. Pigment Yellow 153 (e.g., Nickel Nitroso Yellow), and a metallic complex azomethine pigment such as C.I. Pigment Yellow 117 (e.g., Copper Azomethine Yellow).

Examples of pigments exhibiting red or magenta color include a monoazo pigment such as C.I. Pigment Red 3 (e.g., Toluidine Red), a disazo pigment such as C.I. Pigment Red 38 (e.g., Pyrazolone Red B), an azo lake pigment such as C.I. Pigment Red 53:1 (e.g., Lake Red C) and C.I. Pigment Red 57:1 (e.g., Brilliant Carmine 6B), a condensed azo pigment such as C.I. Pigment Red 144 (e.g., Condensed Azo Red BR), an acidic dye lake pigment such as C.I. pigment red 174 (e.g., Phloxin B lake), a basic dye lake pigment such as C.I. Pigment Red 81 (e.g., Rhodamine 6G' Lake), an anthraquinone pigment such as C.I. Pigment Red 177 (e.g., Dianthraquinonyl Red), a thioindigo pigment such as C.I. Pigment Red 88 (e.g., Thioindigo Bordeaux), a perynone pigment such as C.I. Pigment Red 194 (e.g., Perynone Red), a perylene pigment such as C.I. Pigment Red 149 (e.g., Perylene Scarlett), a quinacridone pigment such as C.I. Pigment Violet 19 (unsubstituted quinacridone), C.I. Pigment Red 122 (e.g., Quinacridone Magenta), an isoindolinone pigment such as C.I. Pigment Red 180 (e.g., Isoindolinone Red 2BLT), and an alizarin lake pigment such as C.I. Pigment Red 83 (e.g., Madder Lake).

Examples of pigments exhibiting blue or cyan color include a disazo pigment such as C.I. Pigment Blue 25 (e.g., Dianisidine Blue), a phthalocyanine pigment such as C.I. Pigment Blue 15 (e.g., Phthalocyanine Blue), an acidic dye lake pigment such as C.I. Pigment Blue 24 (e.g., Peacock Blue Lake), a basic dye lake pigment such as C.I. Pigment Blue 1 (e.g., Victoria Pure Blue BO Lake), an anthraquinone pigment such as C.I. Pigment Blue 60 (e.g., Indanthrone Blue), and an alkali blue pigment such as C.I. Pigment Blue 18 (e.g., Alkali Blue V-5:1).

Examples of pigments exhibiting green color include a phthalocyanine pigment such as C.I. Pigment Green 7 (Phthalocyanine Green), and C.I. Pigment Green 36 (Phthalocyanine Green), and an azo metal complex pigment such as C.I. Pigment Green 8 (Nitroso Green).

Examples of pigments exhibiting orange color include an isoindolin pigment such as C.I. Pigment Orange 66 (Isoindolin Orange), and an anthraquinone pigment such as C.I. Pigment Orange 51 (Dichloropyranthrone Orange).

Examples of pigments exhibiting black color include carbon black, titanium black, and aniline black.

As specific examples of white pigment, basic lead carbonate ($2PbCO_3Pb(OH)_2$, so-called silver white), zinc oxide (ZnO, so-called zinc white), titanium oxide ($TiO_2$, so-called, titanium white), and strontium titanate ($SrTiO_3$, so-called titanium strontium white) are employable.

Here, titanium oxide has a lesser specific gravity and a greater refractive index, and is chemically and physically stable, compared to other white pigments. Therefore, it has a greater concealing and tinting power as a pigment, and furthermore has a superior durability against acid, alkali, and other environments. Therefore, the titanium oxide is preferably used as a white pigment. Of course, other white pigments (which may be other than the abovementioned white pigments) may be used as necessary.

For dispersing the pigment, respective dispersing devices such as a ball mill, a sand mill, an attritor, a roll mill, a jet mill, a homogenizer, a paint shaker, a kneader, an agitator, a Henschel mixer, a colloid mill, an ultrasonic homogenizer, a pearl mill, and a wet type jet mill may be used.

Dispersing agents can also be added when a pigment is to be dispersed. Examples of the dispersing agent include a hydroxy group including carboxylate ester, a salt of long-chain polyaminoamide and high molecular weight acid ester, a salt of high molecular weight polycarboxylate, a high molecular weight unsaturated acid ester, a high molecular weight copolymer, a modified polyacrylate, an aliphatic polyvalent carboxylic acid, a naphthalenesulfonic acid-formalin condensate, a polyoxyethylenealkyl phosphate ester, and pigment derivatives. Moreover, a commercially available polymer dispersing agent such as a SOLSPERSE series; trade name, made by AstraZeneca PLC. may be preferably used.

As a dispersing auxiliary, a synergist according to various types of pigments may be used. 1 parts by mass to 50 parts by mass of the dispersing agent and the dispersing auxiliary are preferably added with respect to 100 parts by mass of the pigment.

In the ink composition, a solvent may be added as a dispersion medium for various components such as a pigment. Moreover, other polymerizable compound serving as a low molecular weight component may be used as a dispersion medium, without any solvent. It is preferable that the ink composition substantially contains no solvent other than the polymerizable monomer.

The volume average particle diameter of the pigment is preferably in a range of from 0.02 μm to 0.6 μm, more preferably in a range of from 0.02 μm to 0.1 μm, and still more preferably in a range of from 0.02 μm to 0.07 μm.

As the volume average particle diameter of the pigment, a value measured by using a laser diffraction/scattering particle size distribution analyzer (trade name: LA-920, manufactured by Horiba, Ltd.) and using tripropylene glycol methyl ether as the solvent for measurement is used.

The types of the pigment, dispersant, and dispersion medium are selected and dispersion conditions and filtration conditions are set such that the average particle diameter of the pigment particles is adjusted within the above preferable range. By controlling the particle diameter, clogging of head nozzles is prevented and the storage stability, transparency, and curing sensitivity of the ink composition can be preserved.

(Dye)

The dye used in the ink composition of the invention is preferably an oil-soluble dye. Specifically, the oil-soluble dye means a dye having a solubility in water at 25° C. (the mass of the dye that is dissolved in 100 g of water) of 1 g or less. The solubility is preferably 0.5 g or less, and more preferably 0.1 g or less. Accordingly, a so-called oil-soluble dye that is insoluble in water is preferably used.

(Content of Colorant)

In the case of using a colorant, the colorant is preferably added at a range of from 0.05% by mass to 20% by mass, and more preferably at a range of from 0.2% by mass to 10% by mass, in terms of solid content, with respect to the total amount of the ink composition. In the case of using an oil-soluble dye as the colorant, the oil-soluble dye is particularly preferably added at a range of from 0.2% by mass to 6% by mass, with respect to the total weight of the ink composition (including the solvent).

When the content of the colorant is within the above range, a color density is sufficiently obtained, and the appropriate curability of the ink composition of the invention is preserved, which is thus preferable.

—Other Components in Ink Composition—

The ink composition of the invention may contain known additives, which are used in ink compositions, according to the purposes, as long as the effects of the invention are not impaired.

<Ultraviolet Absorber>

In the ink composition in the present invention, an ultraviolet absorber may be used from the viewpoints of improving the weather resistance, preventing discoloration of the obtained image and the like, in a content range at which advantageous effects of the present invention are not undermined.

Examples of the ultraviolet absorber include benzotriazol compounds described in JP-A Nos. 58-185677, 61-190537, 02-782, 05-197075 and 09-34057; benzophenone compounds described in JP-A Nos. 46-2784 and 05-194483, and U.S. Pat. No. 3,214,463; cinnamic acid compounds described in JP-B Nos. 48-30492 and 56-21141, and JP-A No. 10-88106; triazine compounds described in JP-A Nos. 04-298503, 08-53427, 08-239368, and 10-182621, and JP-W No. 08-5012911; compounds described in Research Disclosure No. 24239; and compounds which absorb ultraviolet rays to generate fluorescence, such as stilbene and benzoxazol compounds, being so-called fluorescent brightening agents.

The addition amount is suitably selected according to the object, however generally it is in a range from 0.5% by mass to 15% by mass in terms of solid contents.

<Anti-Fading Agent>

In the ink composition of the invention, an anti-fading agent selected from various kinds of organic compounds and metal complex compounds can be used. Examples of an organic compound-based anti-fading agent include hydroquinone compounds, alkoxyphenol compounds, dialkoxyphenol compounds, phenol compounds, aniline compounds, amine compounds, indane compounds, chroman compounds, alkoxyaniline compounds, and heterocyclic compounds. Examples of a metal complex compound-based anti-fading agent include nickel complexes and zinc complexes. Specifically, compounds described in the patents cited in Research Disclosure No. 17643, chapter VII, items Ito J; Research Disclosure No. 15162; Research Disclosure No. 18716, page 650, the left-hand column; Research Disclosure No. 36544, page 527; Research Disclosure No. 307105, page 872; and Research Disclosure No. 15162; and compounds within the scope of the formulae of the representative compounds and compound examples described on pages 127 to 137 of JP-A No. S62-215272 can be used.

The addition amount thereof is selected as appropriate according to the intended use; however, the addition amount is generally from about 0.1% by mass to about 8% by mass in terms of solid content.

<Electrically Conductive Salt>

To the ink composition of the invention, for the purpose of controlling the jetting physical properties, an electrically conductive salt, such as potassium thiocyanate, lithium nitrate, ammonium thiocyanate, or dimethylamine hydrochloride, can be added.

<Physical Properties of Ink Composition>

The viscosity of the ink composition of the invention at 25° C. is in a range of from 10 mPa·s to 50 mPa·s, preferably in a range of from 10 mPa·s to 30 mPa·s, and more preferably in a range of from 10 mPa·s to 25 mPa·s. The composition ratio is appropriately adjusted such that the viscosity of the ink composition falls within the above range, and it is preferable that that the viscosity is set within the preferable range.

When the viscosity is within this range, ejection using an inkjet recording apparatus can be conducted favorably.

In this specification, as the viscosity, a value measured by a measurement method using a viscometer, VISCOMETER RE-85L (trade name, manufactured by TOKI SANGYO CO., LTD.), under the condition of 25° C. is used.

The surface tension of the ink composition of the invention is preferably from 20 mN/m to 30 mN/m, and more preferably from 23 mN/m to 28 mN/m. In the case of recording on various types of recording media such as polyolefin, PET, coated paper, or uncoated paper, the surface tension is preferably 20 mN/m or more in view of suppression of bleeding and penetration, and is preferably 30 mN/m or less in view of wettability.

In this specification, as the surface tension, a value measured by a measurement method using a surface tensiometer DY-700 (trade name, manufactured by Kyowa Interface Science Co., Ltd.) at a temperature of 30° C. is used.

The ink composition for inkjet recording according to the invention is prepared in accordance with the method described above.

The ink composition of the invention is ejected onto a recording medium by using an inkjet recording apparatus, and thereafter, the ejected ink composition is cured by irradiation with actinic energy ray, to form an ink image on the recording medium.

[Inkjet Recording Method]

Next, an inkjet recording method using the ink composition of the invention is explained.

The inkjet recording method of the invention includes a process (also referred to as an "ink application process") of applying the ink composition of the invention onto a recording medium by using an inkjet recording apparatus, and a process (also referred to as a "curing process") of applying energy to the ink composition that has been applied onto the recording medium, to cure the ink composition.

In the inkjet recording method of the invention, it is preferable that the ink composition is heated to 35° C. to 80° C. to adjust the viscosity of the ink composition within the range of from 3 mPa·s to 30 mPa·s, and more preferably within the range of from 3 mPa·s to 15 mPa·s, and then ejected. By using the method of adjusting the viscosity, favorable discharge stability can be realized.

Further, fluctuation in the viscosity of the ink composition exerts significant influence on the change in the size of droplets and the change in the droplet jetting speed. Thus, it is preferable to keep the temperature of the ink composition at the time of ejection as constant as possible. From such a point of view, concerning the control range of the temperature of the ink composition, the difference between the real temperature and the set temperature is preferably within ±5° C., more preferably within ±2° C., and still more preferably within ±1° C.

As described above, when the ink composition of the invention has a viscosity at 25° C. of 50 mPa·s or less, ejection of the ink composition can be carried out favorably. By using the method of adjusting the viscosity of the ink composition, favorable discharge stability can be realized.

<Inkjet Recording Apparatus>

There is no particular limitation as to the inkjet recording apparatus, which can be used for the inkjet recording method of the invention, and a known inkjet recording apparatus capable of achieving a desired resolution can be arbitrary selected and used. That is, any one of known inkjet recording apparatuses including commercially available products can carry out ejection of the ink composition onto the recording medium in the ink application process of the inkjet recording method of the invention.

An example of the inkjet recording apparatus, which can be used in the method according to the invention, is an apparatus including an ink supply system, a temperature sensor, and an actinic energy ray source.

An example of the ink supply system is an ink supply system including a stock tank that contains the ink composition of the invention, a supply pipe, an ink supply tank that is placed just before the inkjet head, a filter, and a piezo type inkjet head.

It is preferable that the piezo type inkjet head can eject multi-sized dots having a volume of from 1 pL to 100 pL, and more preferably from 8 pL to 30 pL. Regarding the resolution, the inkjet head can be driven such that the ejection can be performed at a resolution of, preferably from 320 dpi×320 dpi to 4,000 dpi×4,000 dpi, more preferably from 400 dpi×400 dpi to 1,600 dpi×1,600 dpi, and still more preferably 720 dpi×720 dpi. Note that, the term "dpi" used in the invention represents the number of dots per 2.54 cm (dot per inch).

It is preferable that the inkjet recording apparatus suitable for the inkjet recording method according to the invention is equipped with a means for stabilizing the temperature of the ink composition. All of the pipe systems and members in a section from the ink tank (in the case of having an intermediate tank, the intermediate tank) to the discharge face of the nozzle are maintained at a constant temperature. Namely, it is preferable that the inkjet recording apparatus is equipped with a temperature stabilizing means that can thermally insulate and heat the section from the ink supply tank to the inkjet head portion.

The method of controlling the temperature is not particularly limited. For example, it is preferable to dispose plural temperature sensors at each of the pipe parts and to control heating according to the flow rate of the ink composition and environmental temperature. Further, it is preferable that the head unit to be heated is thermally shielded or thermally insulated such that the apparatus itself is not influenced by the temperature of the outside air. In order to shorten the printer start up time required for heating or in order to reduce the thermal energy loss, it is preferable to thermally insulate the head unit from other parts and reduce the heat capacity of the entire of the heating unit.

The inkjet head used for the inkjet recording method of the invention is preferably an inkjet head having a nozzle plate, the surface of which on the ink discharge side has been subjected to an ink-philicity imparting treatment.

Examples of the inkjet head having a nozzle plate, the surface of which on the ink discharge side has been subjected to an ink-philicity imparting treatment, include a piezoelectrically driven on-demand inkjet head manufactured by FUJIFILM DIMATIX (registered trademark), Inc. Specific examples thereof include S-CLASS and Q-CLASS SAPPHIRE (all trade names).

The nozzle plate in the above inkjet head is a nozzle plate, the surface of which on the ink discharge side has been subjected to an ink-philicity imparting treatment. Here, in the nozzle plate, a nozzle plate, at least a portion of the surface of which on the ink discharge side has been subjected to an ink-philicity imparting treatment, is preferable, and a nozzle plate, the entire surface of which on the ink discharge side has been subjected to an ink-philicity imparting treatment, is more preferable.

An example of a method of subjecting the surface of a nozzle plate to an ink-philicity imparting treatment is a method of forming one or more non-ink repellent layers on at least a portion of the surface of a nozzle plate.

Specifically, in a preferable embodiment, a layer formed from at least one metal or metal compound selected from the group consisting of gold, stainless steel, iron, titanium, tantalum, platinum, rhodium, nickel, chromium, silicon oxide, silicon nitride, and aluminum nitride is disposed on at least a portion of the surface of the nozzle plate on the ink discharge side. The metal or metal compound layer to be formed is more preferably a layer formed from at least one selected from the group consisting of gold, stainless steel, iron, titanium, silicon oxide, silicon nitride, and aluminum nitride, still more preferably a layer formed from at least one selected from the group consisting of gold, stainless steel, and silicon oxide, and most preferably a layer formed from silicon oxide.

Regarding the method of subjecting the surface of a nozzle plate to an ink-philicity imparting treatment, the method of forming a metal or metal compound layer is not particularly limited and a known method can be used. Examples of the method include a method of thermally oxidizing the surface of a nozzle plate made of silicone to form a silicon oxide film, a method of oxidatively forming an oxide film of silicone or a substance other than silicon, and a method of forming a metal or metal compound layer by sputtering. For the details on the method of subjecting the surface of a nozzle plate to an ink-philicity imparting treatment, description in U.S. Patent Application Publication No. 2010/0141709 can be referred to.

Next, the curing process, namely, the process of applying energy to the ejected ink composition to cure the ink composition is explained.

Regarding the energy applying method, as described above in the explanation of the polymerizable composition, a method of irradiating actinic energy ray, specifically, ultraviolet ray having a peak wavelength within the range of from 340 nm to 400 nm, is preferable.

Since the ink composition of the present invention contains the polymerizable composition of the invention, the ink composition cures with high sensitivity when irradiated with actinic energy ray even at low output, to form an ink image having a high strength. Accordingly, it is preferable that irradiation with ultraviolet ray is conducted under the condition of an illuminance at the exposed face of from 10 mW/cm$^2$ to 4,000 mW/cm$^2$, and more preferably from 20 mW/cm$^2$ to 2,500 mW/cm$^2$.

A basic method of irradiation is disclosed in JP-A No. S60-132767. Specifically, a light source is provided on each side of a head unit, and the head and the light sources are made to scan by a shuttle system. Irradiation is conducted when a definite period of time has lapsed since deposit of ink. Further, curing is completed using another light source that is not driven. WO 99/54415 discloses, as an irradiation method, a method using an optical fiber, and a method of directing a collimated light to a mirror surface, which is provided on the side face of a head unit, to irradiate a recorded area with UV light. In the invention, it is possible to employ the above-described irradiation methods.

Regarding the light source for ultraviolet ray irradiation, in addition to a mercury lamp and a gas or solid-state laser, which are conventionally used, a GaN semiconductor ultraviolet ray-emitting device, a light emitting diode (LED), a laser diode (LD), and the like, which have small dimensions, a long life time, and high efficiency and are inexpensive, are each expected as a light source for photo-curable inkjet.

Particularly, in the case of using an ultraviolet light source, an ultraviolet LED (UV-LED) or an ultraviolet LD (UV-LD) may be used. For example, a UV-LED manufactured by Nichia Corporation, in which the main emission spectrum has a wavelength within the range of from 365 nm to 420 nm, may be used. In the case of performing exposure with light having shorter wavelength, an LED described in U.S. Pat. No. 6,084,250, which can emit actinic energy ray whose wavelength is centered between 300 nm and 370 nm, or the like can be applied. In the method of the invention, a particularly preferable actinic energy ray source is a UV-LED, and a UV-LED emitting light having a peak wavelength within the range of from 340 nm to 400 nm is particularly preferably used.

In forming an image by an inkjet recording method using the ink composition of the invention, actinic energy ray is preferably irradiated for 0.01 seconds to 120 seconds, and more preferably for 0.1 seconds to 90 seconds.

The conditions for irradiation with actinic energy ray and a basic method of irradiation are disclosed in JP-A No. S60-132767.

In the inkjet recording method of the invention, it is desirable that the ink composition is heated to a definite temperature and that the time from deposition to irradiation is set from 0.01 seconds to 0.5 seconds. The radiation is preferably irradiated after 0.01 seconds to 0.3 seconds, and more preferably after 0.01 seconds to 0.15 seconds. As such, by controlling the time from deposition to irradiation to an extremely short time, it becomes possible to prevent bleeding of the deposited ink before curing. Even when the recording medium is porous, it is possible to perform exposure before the ink composition penetrates to a deep portion where the light cannot reach, and thus, the amount of unreacted residual polymerizable compound is reduced and, as a result, the strength of the cured film may be enhanced and odor at the time of exposure may be reduced.

In order to obtain a multi-color image, inks of respective colors are preferably disposed one on another in order of increasing lightness. By disposing the ink compositions one by one in order of increasing lightness, the actinic energy ray is likely to reach the lower ink composition, so that favorable curing sensitivity, a decrease in the amount of residual polymerizable compound, and improvement in adhesion to the base material can be expected. Further, concerning the irradiation, exposure may be carried out after ejection of all colors; however, from the viewpoint of acceleration of curing, it is preferable to carry out exposure every after deposition of one color.

(Recording Medium)

The recording medium, which can be applied with the ink composition of the invention or which can be used for the inkjet recording method of the invention, is not particularly limited, and any of known recording media can be used. For example, papers such as generally used uncoated paper or coated paper, various kinds of non-absorbing resin materials used for so-called soft packaging, or resin films obtained by molding resin materials into a film shape can be used. Examples of plastic films include a polyethylene terephthalate (PET) film, a biaxially stretched polystyrene (OPS) film, a biaxially stretched polypropylene (OPP) film, a biaxially stretched polyamide (ONy) film, a polyvinyl chloride (PVC) film, a polyethylene (PE) film, and a triacetylcellulose (TAC) film. In addition, examples of a plastic material, which can be used as the recording medium, include polycarbonate, an acrylic resin, an acrylonitrile/butadiene/styrene copolymer (ABS), polyacetal, polyvinyl alcohol (PVA), rubber, and a composite thereof. Moreover, a metal film, a metal plate, glass, or the like can be used as the recording medium.

[Recorded Matter]

The recorded matter of the invention has a recording medium and an image that is recorded on the recording medium by using the ink composition of the invention. Namely, a recording matter can be obtained, for example, by applying the ink composition of the invention onto a recording medium, using an inkjet recording apparatus, and then irradiating the ink composition, that has been applied, with actinic radiation, to cure the ink composition. Alternatively, both of irradiation with actinic radiation and heating may be performed.

The ink composition of the invention can be applied for use other than image formation using an ink. Particularly, since the ink composition of the invention is cured by irradiation with energy ray such as ultraviolet ray, has excellent adhesion to the recording medium, and can provide an ink image having a favorable strength, namely, a cured film, the ink composition may be used, for example, for forming an image recording layer that serves as an ink receiving layer of a lithography plate, or the like.

EXAMPLES

Hereinafter, the present invention is specifically described with reference to Examples; however, the invention is by no means limited to the forms in these Examples.

Unless otherwise specifically stated, the "parts" and "%" are based on mass.

Among the compounds used in the Examples and Comparative Examples, the compounds, whose manufacturers are not described, were synthesized by a known method, or by applying a known method.

<Preparation of Pigment Dispersion>

The pigment, dispersing agent, and polymerizable compound shown below were mixed and stirred using a mixer (trade name: L4R, manufactured by Silverson Machines, Inc.) at a rotation speed of 2,500 r/min for 10 minutes, to obtain a mixture. Thereafter, the resulting mixture was placed in a bead mill disperser DISPERMAT LS (trade name, manufactured by VMA-GETZMANN GMBH), and dispersion was conducted using a YTZ ball (trade name, manufactured by NIKKATO CORPORATION) having a diameter of 0.65 mm, at a rotation speed of 2,500 r/min for 6 hours, to prepare pigment dispersions of respective colors (Y, M, C, K, and W).

Details of the components used for the preparation of the pigment dispersions are shown below.

C.I. PIGMENT YELLOW 12 (yellow pigment, manufactured by Clariant)
C.I. PIGMENT RED 57:1 (magenta pigment, manufactured by Clariant)
C.I. PIGMENT BLUE 15:3 (cyan pigment, manufactured by Clariant)
C.I. PIGMENT BLACK 7 (black pigment, manufactured by Clariant)
MICROLITH (registered trademark) WHITE R-A (white pigment, manufactured by BASF)
SOLSPERSE 32000 (trade name, manufactured by The Lubrizol Corporation; polymer dispersant)

Yellow Pigment Dispersion (Y)

| | |
|---|---|
| Pigment: C.I. PIGMENT YELLOW 12 | 10 parts |
| Dispersant: SOLSPERSE 32000 | 5 parts |
| Monofunctional polymerizable compound: 2-phenoxyethyl acrylate | 85 parts |

Magenta Pigment Dispersion (M)

| | |
|---|---|
| Pigment: C.I. PIGMENT RED 57:1 | 15 parts |
| Dispersant: SOLSPERSE 32000 | 5 parts |
| Monofunctional polymerizable compound: 2-phenoxyethyl acrylate | 80 parts |

Cyan Pigment Dispersion (C)

| | |
|---|---|
| Pigment: C.I. PIGMENT BLUE 15:3 | 20 parts |
| Dispersant: SOLSPERSE 32000 | 5 parts |
| Monofunctional polymerizable compound: 2-phenoxyethyl acrylate | 75 parts |

Black Pigment Dispersion (K)

| | |
|---|---|
| Pigment: C.I. PIGMENT BLACK 7 | 20 parts |
| Dispersant: SOLSPERSE 32000 | 5 parts |
| Monofunctional polymerizable compound: 2-phenoxyethyl acrylate | 75 parts |

White Pigment Dispersion (W)

| | |
|---|---|
| Pigment: MICROLITH WHITE R-A | 20 parts |
| Dispersant: SOLSPERSE 32000 | 5 parts |
| Monofunctional polymerizable compound: 2-phenoxyethyl acrylate | 75 parts |

Examples 1 to 21 and Comparative Examples 1 to 4

Preparation of Ink Composition

The components described below (total amount: 13 parts) were further added to the components shown in Table 1 and, mixed and stirred using a mixer (trade name: L4R, manufactured by Silverson Machines, Inc.) at a rotation speed of 1,000 r/min for 5 minutes, to obtain a mixture. Thereafter, the resulting mixture was filtrated using a cartridge filter (trade name: PROFILE II AB01A01014J, manufactured by Nihon Pall Ltd.), to prepare ink compositions of Examples 1 to 21 and Comparative Examples 1 to 4.

The viscosities at 25° C. of the ink compositions thus prepared were all within the range of from 19 mPa·s to 30 mPa·s, as shown in Table 2 below. The viscosity of the ink composition was measured using a viscometer, VISCOMETER RE-85L (trade name, manufactured by TOKI SANGYO CO., LTD.), under the condition of 25° C.

| | |
|---|---|
| Polymerization inhibitor: GENORAD 16 | 0.75 parts |
| Photopolymerization initiator (initiator (B)): ITX | 2.0 parts |
| Photopolymerization initiator (initiator (B)): IRGACURE 184 | 2.2 parts |
| Photopolymerization initiator (initiator (B)): IRGACURE 819 | 8.0 parts |
| Surfactant: BYK 307 | 0.05 parts |

(The sum of the amounts of the above components and the amounts of the components described in Table 1:100 parts)

Note that, in Table 1 to Table 3 below, "–" means that the corresponding component is not included.

In the following Table 1, the amount of "PEA (*)" includes the amount of the PEA derived from the pigment dispersion.

TABLE 1

| | CD (A) or Comp. CD | | Additional Polymerizable CD (C) | | | | | PFP-CD | Pigment Dispersion | |
|---|---|---|---|---|---|---|---|---|---|---|
| | | | Monofunctional Polymerizable CD | | | | | | | |
| | | Amt | (prt) | | | | | (prt) | | Amt |
| Ex. | Kind | (prt) | IBOA | PEA | CTFA | THFA | EOEOEA | DPHA | Kind | (prt) |
| 1 | A-7 | 20 | 15 | 20 | 20 | — | — | 5 | Y | 7 |
| 2 | A-7 | 20 | 15 | 14 | 20 | — | — | 5 | M | 13 |
| 3 | A-7 | 20 | 15 | 20 | 20 | — | — | 5 | C | 7 |

TABLE 1-continued

| | CD (A) or Comp. CD | | Additional Polymerizable CD (C) | | | | | | Pigment Dispersion | |
|---|---|---|---|---|---|---|---|---|---|---|
| | | | Monofunctional Polymerizable CD | | | | | PFP-CD | | |
| | | Amt | (prt) | | | | | (prt) | | Amt |
| Ex. | Kind | (prt) | IBOA | PEA | CTFA | THFA | EOEOEA | DPHA | Kind | (prt) |
| 4 | A-7 | 20 | 15 | 20 | 20 | — | — | 5 | K | 7 |
| 5 | A-7 | 20 | 15 | 14 | 20 | — | — | 5 | W | 13 |
| 6 | A-7 | 20 | 15 | 27 | 20 | — | — | 5 | — | — |
| 7 | A-1 | 20 | 15 | 20 | 20 | — | — | 5 | K | 7 |
| 8 | A-2 | 20 | 15 | 20 | 20 | — | — | 5 | K | 7 |
| 9 | A-3 | 20 | 15 | 20 | 20 | — | — | 5 | K | 7 |
| 10 | A-4 | 20 | 15 | 20 | 20 | — | — | 5 | K | 7 |
| 11 | A-5 | 20 | 15 | 20 | 20 | — | — | 5 | K | 7 |
| 12 | A-6 | 5 | 15 | 35 | 20 | — | — | 5 | K | 7 |
| 13 | A-6 | 10 | 15 | 30 | 20 | — | — | 5 | K | 7 |
| 14 | A-6 | 15 | 15 | 25 | 20 | — | — | 5 | K | 7 |
| 15 | A-6 | 20 | 15 | 20 | 20 | — | — | 5 | K | 7 |
| 16 | A-6 | 25 | 15 | 15 | 20 | — | — | 5 | K | 7 |
| 17 | A-6 | 30 | 15 | 5 | 25 | — | — | 5 | K | 7 |
| 18 | A-6 | 35 | 15 | 5 | 20 | — | — | 5 | K | 7 |
| 19 | A-6 | 20 | 15 | 20 | — | 20 | — | 5 | K | 7 |
| 20 | A-6 | 20 | 15 | 20 | — | — | 20 | 5 | K | 7 |
| 21 | A-6 | 20 | 15 | 25 | 20 | — | — | 5 | K | 7 |
| C1 | — | — | 15 | 30 | 30 | — | — | 5 | K | 7 |
| C2 | H-1 | 20 | 15 | 20 | 20 | — | — | 5 | K | 7 |
| C3 | H-2 | 20 | 15 | 20 | 20 | — | — | 5 | K | 7 |
| C4 | H-3 | 20 | 15 | 20 | 20 | — | — | 5 | K | 7 |

In table 1, the abbreviation "Ex." represents "Example Number", the abbreviation "C1", "C2", "C3" and "C4" respectively represents "Comparative Example-1", "Comparative Example-2", "Comparative Example-3" and "Comparative Example-4", the abbreviation "CD" represents "Compound", the abbreviation "Comp." represents "Comparative", the abbreviation "Amt" represents "Amounts", the abbreviation "(prt)" represents "(parts)", and the abbreviation "PFP-CD" represents "Polyfunctional Polymerizable Compound".

Details of each component used in the Examples and Comparative Examples are as follows.

The exemplified compounds (A-1) to (A-7) were used as the compound (A). Structures of the comparative compounds (H–1) to (H-3) are as shown below.

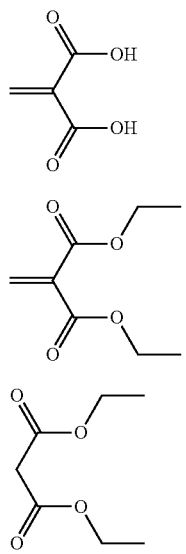

The initiator (B), the additional polymerizable compound (C), and the additives are as follows.

IBOA (isobornyl acrylate, monofunctional radically polymerizable compound, ARONIX M-156 (trade name), manufactured by TOAGOSEI CO., LTD.)

PEA (2-phenoxyethyl acrylate, monofunctional radically polymerizable compound, BISCOAT #192 (trade name), manufactured by Osaka Organic Chemical Industry Ltd.)

CTFA (cyclic trimethylolpropane formal acrylate, SR-531 (trade name), manufactured by Sartomer Company Inc., monofunctional polymerizable compound; additional polymerizable compound (C))

THFA (tetrahydrofurfuryl acrylate, SR285 (trade name), manufactured by Sartomer Company Inc., monofunctional polymerizable compound; additional polymerizable compound (C))

EOEOEA (2-(2-ethoxyethoxy)ethyl acrylate, SR256 (trade name), manufactured by Sartomer Company Inc., monofunctional polymerizable compound; additional polymerizable compound (C))

DPHA (dipentaerythritol hexaacrylate, hexa-functional radically polymerizable compound, A-DPH (trade name), manufactured by Shin-Nakamura Chemical Co., Ltd., polyfunctional polymerizable compound; additional polymerizable compound (C))

ITX (2,4,6-trimethylbenzoyldiphenylphosphine oxide, photopolymerization initiator, manufactured by BASF; initiator (B))

IRGACURE (registered trademark) 184 (1-hydroxycyclohexyl phenyl ketone, photopolymerization initiator, manufactured by BASF; initiator (B))

IRGACURE (registered trademark) 819 (bis(2,4,6-trimethylbenzoyl)phenylphosphine oxide, photopolymerization initiator, manufactured by BASF; initiator (B))

BYK 307 (trade name, manufactured by BYK-Chemie GmbH; surfactant)

GENORAD 16 (trade name, manufactured by Rahn AG; polymerization inhibitor)

[Evaluation of Ink Composition]

With regard to the ink compositions of Examples 1 to 21 and Comparative Examples 1 to 4, evaluation of adhesion to the base material, evaluation of film hardness by a pencil hardness test, and evaluation of discharge stability were performed. The results are shown in Table 2. Note that, some of the components of the ink composition are described in Table 2.

—Evaluation of Adhesion to Base Material—

As the base material (recording medium), a polycarbonate sheet (PC, manufactured by Teijin Chemicals Ltd.) and an acrylic sheet (Acryl, manufactured by Japan Acryace Corp.) were used and, on the respective surfaces, the ink compositions of Examples 1 to 21 and Comparative Examples 1 to 4 obtained were each coated, using a K HAND COATER (trade name) (BAR No. 2) so as to give a wet film thickness of 12 µm.

Subsequently, using an experiment-use UV mini conveyor apparatus CSOT (trade name, manufactured by GS YUASA POWER SUPPLY LTD.) which was equipped with an ozone-free metal halide lamp MAN250L (trade name) and was set at a conveyor speed of 9.0 m/min and an exposure intensity of 2.0 W/cm$^2$, the coated film was cured with energy ray. Evaluation of adhesive property with respect to the recording medium was performed according to the criteria below, using the cured coated film in accordance with ISO 2409 (cross-cut method). The results are shown in Table 2.

Note that, in the criteria 0 to 5 below, the "%" that shows the degree of peeling of lattice cells is the percentage of the proportion of the number of lattice cells, at which peeling is observed, relative to the number of lattice cells of 25, which are formed by making cuts at right angles with an interval of 1 mm.

Proportion of the number of lattice cells peeled(%)=
[(number of lattice cells, at which peeling has occurred)/(total number of lattice cells)]×100

0: the cut edge is smooth, there is no peeling in all the lattice cells.

1: slight peeling of coated film is observed at the intersection of cuts. The number of lattice cells, at which peeling is observed, is 5% or less of the total number of the lattice cells.

2: Peeling is observed at the area along the edge of a cut portion of the coated film and/or at the intersection of cuts. The number of lattice cells, at which peeling is observed, is more than 5% but 15% or less of the total number of the lattice cells.

3: Partial or complete peeling is observed along the edge of a cut portion of the coated film, or partial or complete peeling is observed at various parts of the lattice cells. The number of lattice cells, at which peeling is observed, is more than 15% but 35% or less of the total number of the lattice cells.

4: Partial or complete peeling is observed along the edge of a cut portion of the coated film, or partial or complete peeling is observed at various parts of the lattice cells. The number of lattice cells, at which peeling is observed, is more than 35% but 65% or less of the total number of the lattice cells.

5: The number of lattice cells, at which peeling is observed, exceeds 65% of the total number of the lattice cells.

In the evaluation above, the grades 0 and 1 are considered acceptable in terms of practical application.

—Evaluation of Pencil Hardness—

With regard to the ink cured film prepared in a manner substantially similar to that in the preparation of the cured film used in the evaluation of adhesion to the base material, a pencil hardness test was performed in accordance with JIS K5600-5-4. The results are shown in Table 2.

In the ink composition of the invention, the acceptable range of hardness is HB or higher, and preferably H or higher. Recorded matter, in which the evaluation result is B or lower, has the possibility of occurrence of damage during handling of the recorded matter, which is thus not preferable.

Note that, as the pencil, UNI (registered trademark) manufactured by MITSUBISHIPENCIL CO., LTD. was used.

—Evaluation of Discharge Stability—

In order to evaluate the discharge stability of ink in inkjet recording using head nozzles, the number of nozzle losses (number of clogged nozzles) in 60 minutes continuous ejection, when using a commercially available inkjet recording apparatus (trade name: LUXEL JET UV3600GT/XT, Fujifilm Corporation) equipped with piezo type inkjet nozzles, under the conditions described below, was evaluated.

Experiment was carried out using a PET (polyethylene terephthalate) film (Toray Industries, Inc.) as the recording medium. The number of nozzle losses, in the case of continuously discharging each of the ink compositions of Examples 1 to 20 and Comparative Examples 1 to 4 on the recording medium for 60 minutes under the conditions described below and then performing exposure (exposure value: 1,000 mW/cm$^2$), was counted and evaluated according to the evaluation criteria described below. In the evaluation criteria below, the grades A and B fall in the practically acceptable range.

<Discharge Conditions>
Number of channels: 318 per head
Drive frequency: 4.8 kHz/dot
Ink droplet: 7 droplets, 42 pL
Temperature: 45° C.

<Evaluation Criteria>
A: the number of nozzle losses is less than 5.
B: the number of nozzle losses is 5 or more by less than 10.
C: the number of nozzle losses is 10 or more.

TABLE 2

| | CD (A) or Comp. CD | | Pigment Dispersion | | Ink Composition Viscosity of Ink (25° C.) | Evaluation Results | | | |
|---|---|---|---|---|---|---|---|---|---|
| | | Amt | | Amt | | Adhesion to Base Material | | Pencil | Discharge |
| Ex. | Kind | (prt) | Kind | (prt) | (mPa·s) | PC | Acryl | Hardness | Stability |
| 1 | A-7 | 20 | Y | 7 | 22 | 0 | 0 | H | A |
| 2 | A-7 | 20 | M | 13 | 22 | 0 | 0 | H | A |
| 3 | A-7 | 20 | C | 7 | 22 | 0 | 0 | H | A |
| 4 | A-7 | 20 | K | 7 | 22 | 0 | 0 | H | A |

TABLE 2-continued

| Ex. | Ink Composition CD (A) or Comp. CD Kind | Amt (prt) | Pigment Dispersion Kind | Amt (prt) | Viscosity of Ink Composition (25° C.) (mPa·s) | Evaluation Results Adhesion to Base Material PC | Acryl | Pencil Hardness | Discharge Stability |
|---|---|---|---|---|---|---|---|---|---|
| 5 | A-7 | 20 | W | 13 | 22 | 0 | 0 | H | A |
| 6 | A-7 | 20 | — | — | 22 | 0 | 0 | H | A |
| 7 | A-1 | 20 | K | 7 | 22 | 1 | 1 | HB | A |
| 8 | A-2 | 20 | K | 7 | 22 | 1 | 1 | HB | A |
| 9 | A-3 | 20 | K | 7 | 22 | 0 | 0 | HB | A |
| 10 | A-4 | 20 | K | 7 | 22 | 0 | 0 | HB | A |
| 11 | A-5 | 20 | K | 7 | 20 | 0 | 0 | HB | A |
| 12 | A-6 | 5 | K | 7 | 20 | 1 | 1 | HB | A |
| 13 | A-6 | 10 | K | 7 | 20 | 1 | 0 | HB | A |
| 14 | A-6 | 15 | K | 7 | 21 | 0 | 0 | H | A |
| 15 | A-6 | 20 | K | 7 | 21 | 0 | 0 | H | A |
| 16 | A-6 | 25 | K | 7 | 22 | 0 | 0 | H | A |
| 17 | A-6 | 30 | K | 7 | 22 | 1 | 0 | HB | A |
| 18 | A-6 | 35 | K | 7 | 23 | 1 | 1 | HB | B |
| 19 | A-6 | 20 | K | 7 | 22 | 0 | 0 | H | A |
| 20 | A-6 | 20 | K | 7 | 22 | 0 | 0 | H | A |
| 21 | A-6 | 20 | K | 7 | 21 | 1 | 1 | HB | A |
| C1 | — | — | K | 7 | 19 | 4 | 4 | B | A |
| C2 | H-1 | 20 | K | 7 | 22 | 4 | 4 | B | A |
| C3 | H-2 | 20 | K | 7 | 22 | 4 | 4 | B | A |
| C4 | H-3 | 20 | K | 7 | 22 | 4 | 4 | B | A |

In table 2, the abbreviation "Ex." represents "Example Number", the abbreviation "C1", "C2", "C3" and "C4" respectively represents "Comparative Example-1", "Comparative Example-2", "Comparative Example-3" and "Comparative Example-4", the abbreviation "CD" represents "Compound", the abbreviation "Comp." represents "Comparative", the abbreviation "Amt" represents "Amounts", and the abbreviation "(prt)" represents "(parts)".

As is evident from the results shown in Table 2, it is understood that all the ink compositions of the invention including the transparent ink composition that does not contain a colorant and the ink compositions that contain a colorant, irrespective of the presence or absence of a colorant or the kind of the colorant used, exhibit favorable inkjet discharge stability and excellent adhesion to the recording medium that serves as the base material (adhesion to the base material), and can form a hard ink image.

Further, from the results of Example 12 to Example 18, it is understood that the adhesion to the base material is further improved, when the content of the compound (A) is within the preferable range of from 10 parts by mass to 30 parts by mass.

On the other hand, in all the ink compositions of Comparative Examples 1 to 4, in which the compound (A) is not used or a comparative compound is used, the adhesion between the ink image and the base material that serves as the recording medium is practically problematic and the hardness of the ink image is low, and thus, there is concern that the ink image in a recorded matter is easily damaged.

Example 22 to Example 23 and Comparative Examples 5 to 8

Preparation of Coating Composition

The components described below (total amount: 13 parts) were further added to the components described in Table 3 below and, mixed and stirred using a mixer (trade name: L4R, manufactured by Silverson Machines, Inc.) at a rotation speed of 1,000 r/min for 5 minutes. Thereafter, the resulting mixture was filtrated using a cartridge filter (trade name: PROFILE II AB01A01014J, manufactured by Nihon Pall Ltd.), to prepare coating compositions of Examples 22 to 23 and Comparative Examples 5 to 8.

| | |
|---|---|
| Polymerization inhibitor: GENORAD 16 | 0.75 parts |
| Photopolymerization initiator (initiator (B)): ITX | 2.0 parts |
| Photopolymerization initiator (initiator (B)): IRGACURE 184 | 2.2 parts |
| Photopolymerization initiator (initiator (B)): IRGACURE 819 | 8.0 parts |
| Surfactant: BYK 307 | 0.05 parts |

(The sum of the amounts of the above components and the amounts of the components described in Table 3: 100 parts)

TABLE 3

| Ex. | CD (A) or Comp. CD Kind | Amt (prt) | Additional Polymerizable CD (C) Monofunctional Polymerizable CD (prt) | | | PFP-CD (prt) | Evaluation Results Adhesion to Base Material | Pencil Hardness |
|---|---|---|---|---|---|---|---|---|
| | | | IBOA | PEA | CTFA | DPHA | PVC | |
| 22 | A-6 | 20 | 15 | 27 | 20 | 5 | 0 | H |
| 23 | A-7 | 20 | 15 | 27 | 20 | 5 | 0 | H |

TABLE 3-continued

| Ex. | CD (A) or Comp. CD Kind | Amt (prt) | Additional Polymerizable CD (C) Monofunctional Polymerizable CD (prt) | | | PFP-CD (prt) | Evaluation Results Adhesion to Base Material | Pencil |
|---|---|---|---|---|---|---|---|---|
| | | | IBOA | PEA | CTFA | DPHA | PVC | Hardness |
| C5 | — | — | 15 | 37 | 30 | 5 | 4 | B |
| C6 | H-1 | 20 | 15 | 27 | 20 | 5 | 4 | B |
| C7 | H-2 | 20 | 15 | 27 | 20 | 5 | 4 | B |
| C8 | H-3 | 20 | 15 | 27 | 20 | 5 | 4 | B |

In table 3, the abbreviation "Ex." represents "Example Number", the abbreviation "C5", "C6", "C7" and "C8" respectively represents "Comparative Example-5", "Comparative Example-6", "Comparative Example-7" and "Comparative Example-8", the abbreviation "CD" represents "Compound", the abbreviation "Comp." represents "Comparative", the abbreviation "Amt" represents "Amounts", the abbreviation "(prt)" represents "(parts)", and the abbreviation "PFP-CD" represents "Polyfunctional Polymerizable Compound".

(Evaluation of Coating Composition)

Each of the thus obtained coating compositions of Example 22 to Example 23 and Comparative Example 5 to Comparative Example 8 was coated, using a bar coater, on the surface of a polyvinyl chloride film (described as PVC in Table 3; manufactured by AVERY DENNISON), such that the dry coating amount was $1.0\ g/m^2$, and then exposure was performed using a 200 W mercury xenon lamp (trade name: EXECURE 3000 (manufactured by HOYA), wavelength=365 nm, exposure value: $800\ mJ/cm^2$), to cure the coating composition, thereby forming a cured film. With regard to the cured film thus formed, evaluation of adhesion to the base material and evaluation of pencil hardness were performed in a manner substantially similar to that in Example 1.

The results are shown in Table 3.

As is evident from the results shown in Table 3, it is understood that the coating compositions of the invention exhibit excellent adhesion to the base material, and can form a cured film having a favorable hardness. On the other hand, in all the coating compositions of Comparative Examples 5 to 8, in which the compound (A) is not used or a comparative compound is used, the adhesion between the cured film and the base material is practically problematic and the hardness of the cured film is low, and thus, there is concern that the cured film is easily damaged.

The foregoing description of the exemplary embodiments of the present invention has been provided for the purposes of illustration and description. It is not intended to be exhaustive or to limit the invention to the precise forms disclosed. The embodiments were chosen and described in order to best explain the principles of the invention and its practical applications, thereby enabling others skilled in the art to understand the invention for various embodiments and with the various modifications as are suited to the particular use contemplated.

This application claims priority from Japanese Patent Application No. 2014-183656, filed on Sep. 9, 2014, the disclosure of which is incorporated by reference herein.

All publications, patent applications, and technical standards mentioned in this specification are herein incorporated by reference to the same extent as if such individual publication, patent application, or technical standard was specifically and individually indicated to be incorporated by reference. It will be obvious to those having skill in the art that many changes may be made in the above-described details of the preferred embodiments of the present invention. It is intended that the scope of the invention be defined by the following claims and their equivalents.

What is claimed is:

1. A polymerizable composition, comprising:
   a compound represented by the following Formula (1);
   a polymerization initiator; and
   a polymerizable compound having a chemical structure different from the compound represented by the following Formula (1):

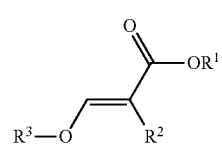

Formula (1)

wherein, in Formula (1), each of $R^1$ and $R^2$ independently represents a hydrogen atom or a monovalent organic group; and $R^3$ represents a monovalent organic group.

2. The polymerizable composition according to claim 1, wherein, in Formula (1), $R^1$ represents a hydrogen atom, an alkyl group or an aryl group; $R^3$ represents an alkyl group or an aryl group; and $R^2$ represents a hydrogen atom, a carboxylic acid group, a carboxylic acid ester group or a cyano group.

3. The polymerizable composition according to claim 1, wherein, in Formula (1), each of $R^1$ and $R^3$ independently represents an alkyl group having 1 to 8 carbon atoms; and $R^2$ represents a hydrogen atom, a carboxylic acid group or a carboxylic acid ester group.

4. The polymerizable composition according to claim 1, wherein, in Formula (1), each of $R^1$ and $R^3$ independently represents a methyl group or an ethyl group; and $R^2$ represents a hydrogen atom.

5. The polymerizable composition according to claim 1, wherein a content of the compound represented by Formula (1) is from 10% by mass to 30% by mass with respect to a total mass of the polymerizable composition.

6. The polymerizable composition according to claim 4, wherein a content of the compound represented by Formula (1) is from 10% by mass to 30% by mass with respect to a total mass of the polymerizable composition.

7. The polymerizable composition according to claim 1, wherein the polymerizable compound having a chemical structure different from the compound represented by Formula (1) comprises a monofunctional polymerizable compound.

8. The polymerizable composition according to claim 7, wherein the monofunctional polymerizable compound is at least one selected from the group consisting of 2-phenoxyethyl acrylate, cyclic trimethylolpropane formal acrylate, isobornyl acrylate, tetrahydrofurfuryl acrylate, 2-(2-ethoxyethoxy)ethyl acrylate, 2-(2-vinyloxyethoxy)ethyl acrylate, octyl acrylate, decyl acrylate, tridecyl acrylate, isodecyl acrylate, lauryl acrylate, 3,3,5-trimethylcyclohexyl acrylate, 4-t-butylcyclohexyl acrylate and N-vinylcaprolactam.

9. The polymerizable composition according to claim 6, wherein the polymerizable compound having a chemical structure different from the compound represented by Formula (1) comprises a monofunctional polymerizable compound, and the monofunctional polymerizable compound is at least one selected from the group consisting of 2-phenoxyethyl acrylate, cyclic trimethylolpropane formal acrylate, isobornyl acrylate, tetrahydrofurfuryl acrylate, 2-(2-ethoxyethoxy)ethyl acrylate, 2-(2-vinyloxyethoxy)ethyl acrylate, octyl acrylate, decyl acrylate, tridecyl acrylate, isodecyl acrylate, lauryl acrylate, 3,3,5-trimethylcyclohexyl acrylate, 4-t-butylcyclohexyl acrylate and N-vinylcaprolactam.

10. The polymerizable composition according to claim 1, wherein the polymerizable compound having a chemical structure different from the compound represented by Formula (1) comprises a polyfunctional polymerizable compound.

11. The polymerizable composition according to claim 10, wherein the polyfunctional polymerizable compound is at least one selected from the group consisting of dipentaerythritol hexaacrylate, 3-methyl-1,5-pentanediol di(meth)acrylate, dipropylene glycol di(meth)acrylate and trimethylolpropane tri(meth)acrylate.

12. The polymerizable composition according to claim 9, wherein the polymerizable compound having a chemical structure different from the compound represented by Formula (1) further comprises a polyfunctional polymerizable compound, and the polyfunctional polymerizable compound is at least one selected from the group consisting of dipentaerythritol hexaacrylate, 3-methyl-1,5-pentanediol di(meth)acrylate, dipropylene glycol di(meth)acrylate and trimethylolpropane tri(meth)acrylate.

13. The polymerizable composition according to claim 1, wherein the polymerization initiator comprises at least one compound selected from the group consisting of acylphosphine oxide compounds and α-aminoketone compounds.

14. An inkjet ink composition, comprising the polymerizable composition according to claim 1.

15. An inkjet ink recording method, comprising:
applying the inkjet ink composition according to claim 14 onto a recording medium using an inkjet recording apparatus; and
curing the inkjet ink composition that has been applied onto the recording medium, by irradiating the ink composition with actinic radiation.

16. Recorded matter, that has been formed using the inkjet ink composition according to claim 14.

17. Recorded matter, that has been recorded by the inkjet ink recording method according to claim 15.

* * * * *